(12) United States Patent
Mirhoseini et al.

(10) Patent No.: US 10,828,629 B2
(45) Date of Patent: Nov. 10, 2020

(54) PHOTOCATALYTIC FILTER

(71) Applicants: Farid Mirhoseini, Arak (IR); Alireza Salabat, Arak (IR)

(72) Inventors: Farid Mirhoseini, Arak (IR); Alireza Salabat, Arak (IR)

( * ) Notice: Subject to any disclaimer, the term of this patent is extended or adjusted under 35 U.S.C. 154(b) by 440 days.

(21) Appl. No.: 15/839,851

(22) Filed: Dec. 13, 2017

(65) Prior Publication Data
US 2018/0104678 A1    Apr. 19, 2018

Related U.S. Application Data

(60) Provisional application No. 62/443,975, filed on Jan. 9, 2017.

(51) Int. Cl.
| | | |
|---|---|---|
| *B01J 31/38* | (2006.01) | |
| *B01J 31/02* | (2006.01) | |
| *B01J 31/06* | (2006.01) | |
| *B01J 35/08* | (2006.01) | |
| *B01J 35/02* | (2006.01) | |
| *B01J 35/00* | (2006.01) | |
| *B01J 37/04* | (2006.01) | |
| *B01J 37/00* | (2006.01) | |
| *C02F 1/32* | (2006.01) | |
| *C02F 1/72* | (2006.01) | |
| *C02F 1/28* | (2006.01) | |
| *B01J 21/06* | (2006.01) | |
| *C02F 101/30* | (2006.01) | |

(52) U.S. Cl.
CPC ............ *B01J 31/38* (2013.01); *B01J 21/063* (2013.01); *B01J 31/0277* (2013.01); *B01J 31/0284* (2013.01); *B01J 31/0298* (2013.01); *B01J 31/06* (2013.01); *B01J 31/069* (2013.01); *B01J 35/004* (2013.01); *B01J 35/008* (2013.01); *B01J 35/023* (2013.01); *B01J 35/026* (2013.01); *B01J 35/08* (2013.01); *B01J 37/0072* (2013.01); *B01J 37/04* (2013.01); *C02F 1/288* (2013.01); *C02F 1/32* (2013.01); *C02F 1/725* (2013.01); *B01J 35/0013* (2013.01); *C02F 1/281* (2013.01); *C02F 1/285* (2013.01); *C02F 2101/308* (2013.01); *C02F 2303/04* (2013.01); *C02F 2305/08* (2013.01); *C02F 2305/10* (2013.01); *Y02W 10/37* (2015.05)

(58) Field of Classification Search
CPC ...... B01J 31/38; B01J 21/063; B01J 31/0277; B01J 31/0284; B01J 31/0298; B01J 31/06; B01J 31/069; B01J 35/004; B01J 35/008; B01J 35/023; B01J 35/026; B01J 35/08; B01J 37/0072; B01J 37/04; B01J 35/0013; C02F 1/288; C02F 1/32; C02F 1/281; C02F 1/285; C02F 2101/308; C02F 2303/04; C02F 2305/08; C02F 2305/10; Y02W 10/37
USPC .......................................................... 502/8
See application file for complete search history.

(56) References Cited

PUBLICATIONS

Farad Mirhoseini, Ionic liquid based microemulsion method for the fabrication of poly(methyl methacrylate)-TiO2 nanocomposite as a highly efficient visible light photocatalyst, RSC Advances, 2015,pp. 12536-12545, vol. 5, issue 17.
Alireza Salabat, Applications of a new type of poly(methyl methacrylate)/TiO2 nanocomposite as an antibacterial agent and a reducing photocatalyst, Photochemical Photobiological Sciences, 2015, vol. 14, issue 9, pp. 1637-1643.
Farid Mirhoseini, Antibacterial activity based poly(methylmethacrylate) supported TiO2 photocatalyst film nanocomposite, Tech J Engin & App Sciences, 2015, vol. 5, issue 1, pp. 115-118.
Tarek S. Jamil, Enhancement of TiO2 behavior on photocaialytic oxidation of MO dye using TiO2/AC under visible irradiation and sunlight radiation, Separation and Purification Technology, 2012, vol. 98, pp. 270-279.
Teik-Thye Lim, TiO2/AC Composites for Synergistic Adsorption-Photocatalysis Processes: Present Challenges and Further Developments for Water Treatment and Reclamation, Critical Reviews in Environmental Science and Technology, 2011, vol. 41, Issue 13, pp. 1173-1230.

*Primary Examiner* — Edward M Johnson
(74) *Attorney, Agent, or Firm* — Bajwa IP Law Firm; Haris Zaheer Bajwa

(57) ABSTRACT

Disclosed herein is a photocatalytic filter, which includes a plurality of cross-linked polymethyl methacrylate (PMMA)/ionic liquid (IL)/TiO$_2$ nanocomposite pellets, and a photocatalytic vessel. The plurality of cross-linked PMMA/IL/TiO$_2$ nanocomposite pellets is placed within the photocatalytic vessel. Each cross-linked PMMA/IL/TiO$_2$ nanocomposite pellet includes a PMMA polymeric matrix, and a plurality of IL/TiO$_2$ core-shell microspheres dispersed within the PMMA polymeric matrix. Moreover, each IL/TiO$_2$ core-shell microsphere includes a core of IL and a shell of TiO$_2$ nanoparticles.

8 Claims, 18 Drawing Sheets

PHOTOCATALYTIC FILTER

CROSS-REFERENCE TO RELATED APPLICATION

This application claims the benefit of priority from U.S. Provisional Patent Application Ser. No. 62/443,975, filed on Jan. 9, 2017, and entitled "CARTRIDGE FILTER WITH A SYNERGISTIC EFFECT OF ADSORPTION-PHOTOCATALYSIS HYBRID PROCESS," which is incorporated herein by reference in its entirety.

TECHNICAL FIELD

The present disclosure generally relates to a photocatalytic filter, particularly to a visible-light-responsive photocatalytic filter including $TiO_2$ nanoparticles with a synergic effect of adsorption-photocatalysis.

BACKGROUND

Photocatalysis is the acceleration of a photoreaction in the presence of a catalyst, and it may be considered as an effective and sustainable technology for removing organic and inorganic pollutants from fluids due to inexpensiveness and safety for human beings and environment. In order to minimize catalyst loss, human health problems, and reusability of the catalyst, the photocatalyst particles, for example, $TiO_2$ nanoparticles may be immobilized in a polymeric matrix. Immobilizing the photocatalyst particles is commonly used for oxidative degradation of organic pollutants and microbial species in water. However, the immobilized photocatalyst faces a new problem that the reaction efficiency is often restricted by the limited contact area of the immobilized photocatalyst.

On the other hand, adsorption technique may be considered as one of the most effective and economic treatment processes that may be used for elimination of non-biodegradable wastewater contamination due to simplicity in operation, low environmental impact, and availability of a wide range of adsorbents.

Hence, utilizing a combination of adsorption and photocatalysis processes may introduce a synergistic effect and may bring several advantages to wastewater industries. In addition, using a combination of adsorption and photocatalysis processes may compensate disadvantages of each technique when operated separately. Therefore, there is a need in the art for a filter with a synergic effect of adsorption-photocatalysis for water decontamination, which may be effective and acceptable for industrial uses.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes a photocatalytic filter, which may include a plurality of cross-linked polymethyl methacrylate (PMMA)/ionic liquid (IL)/$TiO_2$ nanocomposite pellets, and a photocatalytic vessel. The plurality of cross-linked PMMA/IL/$TiO_2$ nanocomposite pellets may be placed within the photocatalytic vessel.

The above general aspect may include one or more of the following features. In one exemplary embodiment, each cross-linked PMMA/IL/$TiO_2$ nanocomposite pellet may include a PMMA polymeric matrix, and a plurality of IL/$TiO_2$ core-shell microspheres dispersed within the PMMA polymeric matrix. Each IL/$TiO_2$ core-shell microsphere may include a core of IL and a shell of $TiO_2$ nanoparticles.

According to some implementations, the photocatalytic filter may include a visible-light-responsive filter. The cross-linked PMMA/IL/$TiO_2$ nanocomposite pellets may have a porosity of between about 50% and about 70%. The photocatalytic vessel may be made up of non-cross-linked PMMA/IL/$TiO_2$ nanocomposite.

According to some implementations, $TiO_2$ nanoparticles may be present in the plurality of cross-linked PMMA/IL/$TiO_2$ nanocomposite pellets with a concentration of less than about 0.05% of the weight of the cross-linked PMMA/IL/$TiO_2$ nanocomposite pellets. In an exemplary embodiment, the IL may include 1-butyl-3-methylimidazolium tetrafluoroborate ([BMIM] [BF4]).

According to some implementations, the IL may be present in the plurality of cross-linked PMMA/IL/$TiO_2$ nanocomposite pellets with a concentration of at least 2% of the weight of the cross-linked PMMA/IL/$TiO_2$ nanocomposite pellets. The PMMA may be present in the plurality of cross-linked PMMA/IL/$TiO_2$ nanocomposite pellets with a concentration between about 70% and about 90% of the weight of the plurality of cross-linked PMMA/IL/$TiO_2$ nanocomposite pellets.

In another general aspect, the present disclosure describes a method for forming a cross-linked polymethyl methacrylate (PMMA)/ionic liquid (IL)/$TiO_2$ nanocomposite. The method may include forming a $TiO_2$/IL mixture by dispersing a plurality of $TiO_2$ nanoparticles in an ionic liquid, forming a $TiO_2$/IL colloid by mixing the $TiO_2$/IL mixture with a solution including a surfactant and methyl methacrylate (MMA) monomers, forming an IL/oil microemulsion containing $TiO_2$ nanoparticles by adding a co-surfactant to the $TiO_2$/IL colloid, and forming the cross-linked PMMA/IL/$TiO_2$ nanocomposite with a porosity between about 50% and about 70% by cross-linking and polymerizing the MMA monomers.

The above general aspect may include one or more of the following features. In one exemplary embodiment, the cross-linking and the polymerizing of the MMA monomers may be done simultaneously. In some exemplary embodiments, cross-linking the MMA monomers may include cross-linking the MMA monomers by adding a cross-linker agent to the IL/oil microemulsion containing $TiO_2$ nanoparticles. In an exemplary embodiment, the cross-linker agent may include one of ethylene glycol dimethacrylate (EGDMA), triethylene glycol, or combinations thereof. The cross-linker agent may have a concentration between about 0.2% and about 1% of the weight of the MMA monomers.

According to some implementations, polymerizing the MMA monomers may include polymerizing the MMA monomers by adding a polymerization initiator to the IL/oil microemulsion containing $TiO_2$ nanoparticles. In an exemplary embodiment, the polymerization initiator may have a concentration between about 0.2% and about 1% of the weight of the MMA monomers. The polymerization initiator may include a hydrophobic polymerization initiator, for example, benzoyl peroxide (BPO).

According to some implementation, forming the $TiO_2$/IL colloid may include using the IL and the surfactant with a molar ratio between 1 and 2. In an exemplary embodiment, the surfactant may include one of Triton X-100, cetyl trimethyl ammonium bromide (CTAB), dioctyl sulfosuccinate sodium (AOT), or combinations thereof. In an exemplary embodiment, the co-surfactant may include one of isobutanol, 1-butanol, 2-butanol, acrylic acid, or combinations thereof.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples to provide a thorough understanding of the relevant teachings related to the exemplary embodiments. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

Conventional photocatalysts, such as titanium dioxide ($TiO_2$) are stimulated to elicit reactive oxygen species (ROS) using ultraviolet (UV) light radiation for degrading organic pollutants in a photocatalysis process. However, application of these photocatalysts is limited due to their wide bandgap which requires UV light irradiation to obtain photocatalytic activity. UV light accounts for a small fraction of the sun's energy compared to visible light, and is hazardous to humans; therefore, these UV-responsive photocatalysts are unsuitable for applications in indoor environments. Moreover, the efficiency of wastewater treatment using only the photocatalysis process is not high enough and needs improvement before the treated water can be widely used by humans.

In order to overcome the shortcomings as described above, disclosed herein is a photocatalytic filter which may be activated using visible-light. The exemplary photocatalytic filter does not require the UV light radiation for performing photocatalysis. Moreover, the photocatalytic filter may benefit from a synergistic effect of adsorption-photocatalysis for degrading pollutants, which aids in improving the efficiency of wastewater treatment.

Figure 1A:
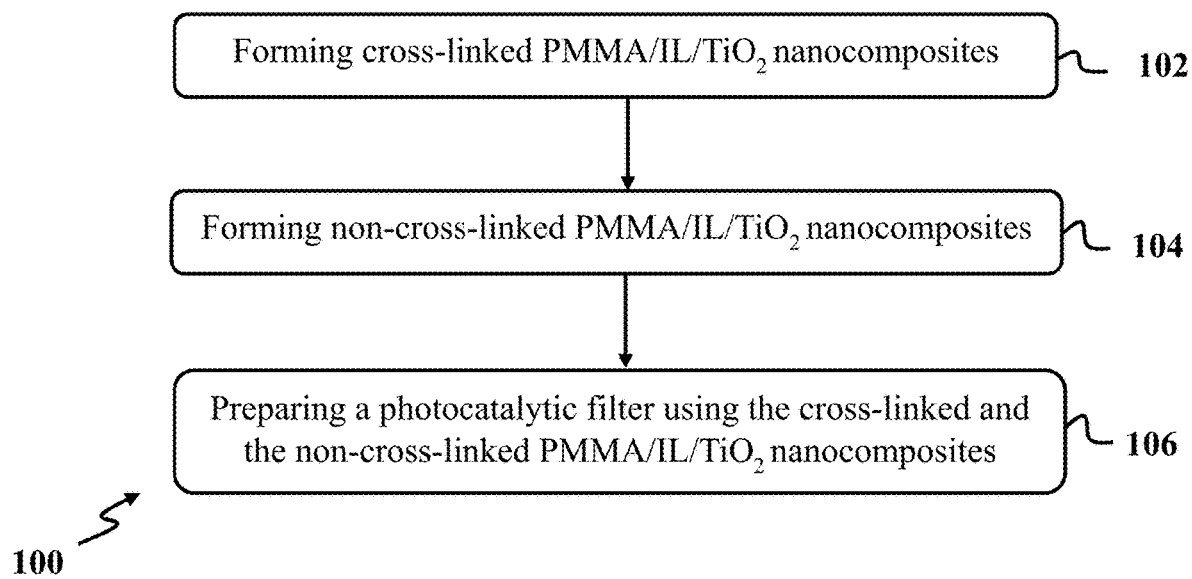
FIG. 1A illustrates a method for preparing a photocatalytic filter, consistent with an exemplary embodiment of the present disclosure.

FIG. 1A shows method 100 for preparing the photocatalytic filter, consistent with an exemplary embodiment of the present disclosure. Method 100 may include forming cross-linked polymethyl methacrylate (PMMA)/ionic liquid (IL)/$TiO_2$ nanocomposites (step 102), forming non-cross-linked PMMA/IL/$TiO_2$ nanocomposites (step 104), and preparing a photocatalytic filter using the cross-linked and the non-cross-linked PMMA/IL/$TiO_2$ nanocomposites (106).

Figure 1B:
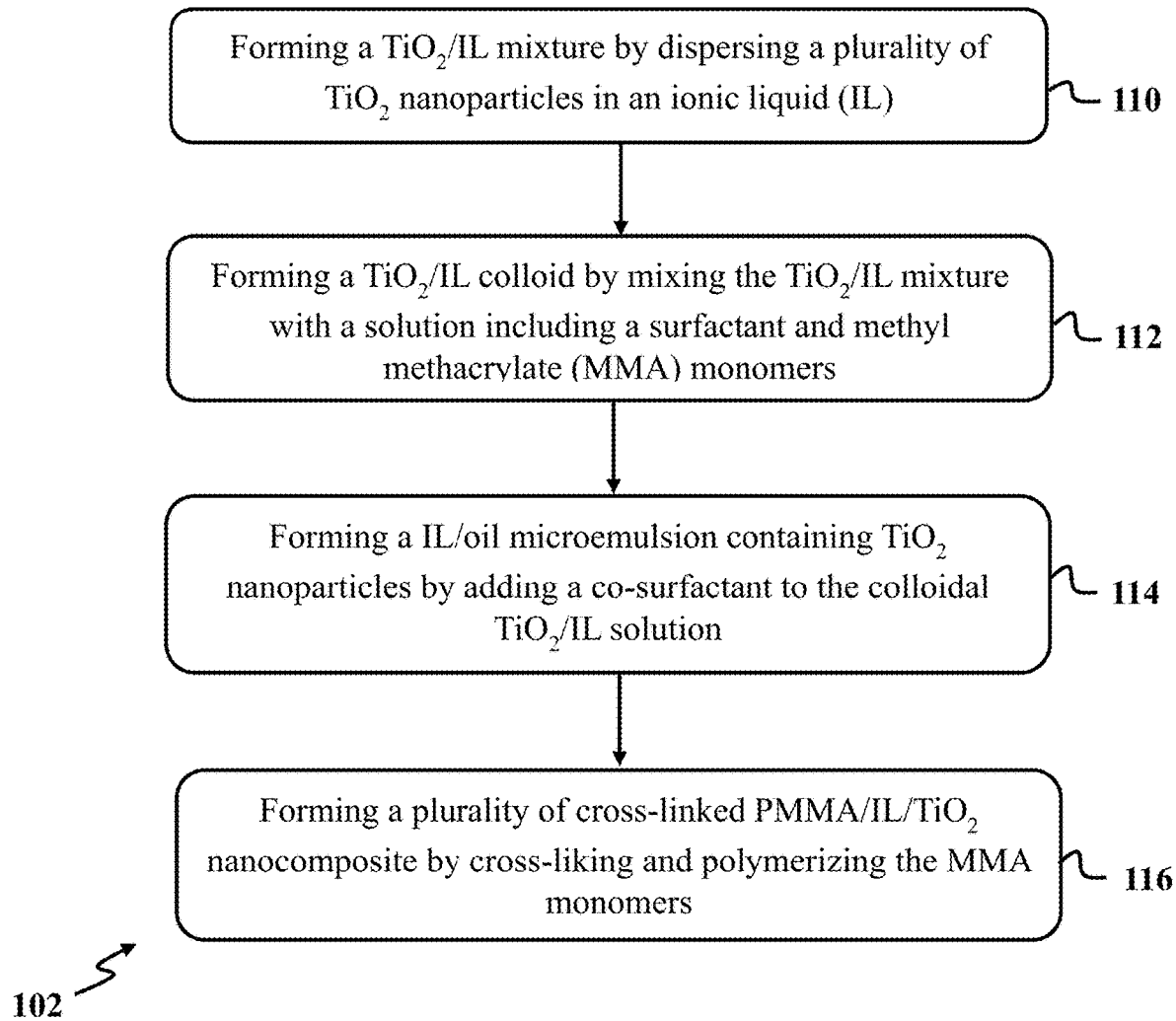
FIG. 1B illustrates a method for forming cross-linked polymethyl methacrylate (PMMA)/ionic liquid (IL)/$TiO_2$ nanocomposites, consistent with an exemplary embodiment of the present disclosure.

Step 102 may include forming the cross-linked PMMA/IL/$TiO_2$ nanocomposites. FIG. 1B shows an exemplary implementation of step 102 for forming the cross-linked PMMA/IL/$TiO_2$ nanocomposites, consistent with an exemplary embodiment of the present disclosure. Forming the cross-linked PMMA/IL/$TiO_2$ nanocomposites may include forming a $TiO_2$/IL mixture by dispersing a plurality of $TiO_2$ nanoparticles in an IL (step 110), forming a $TiO_2$/IL colloid by mixing the $TiO_2$/IL mixture with a solution including a surfactant and a plurality of methyl methacrylate (MMA) monomers (step 112), forming a IL/oil microemulsion containing $TiO_2$ nanoparticles by adding a co-surfactant to the colloidal $TiO_2$/IL solution (step 114), and forming the cross-linked PMMA/IL/$TiO_2$ nanocomposites by adding a cross-linker agent and a polymerization initiator to the IL/oil microemulsion containing $TiO_2$ nanoparticles (step 116).

Step 110 may include forming the $TiO_2$/IL mixture by dispersing the plurality of $TiO_2$ nanoparticles in the IL. Dispersion of the plurality of $TiO_2$ nanoparticles in the IL may be done using an ultrasonic device until a homogenous $TiO_2$/IL mixture forms.

In some exemplary embodiments, the plurality of $TiO_2$ nanoparticles may have a particle size less than about 10 nm, and a surface area of about 50 $m^2/g$. The $TiO_2$ nanoparticles may be dispersed in the IL with the $TiO_2$ nanoparticles present in the cross-linked PMMA/IL/$TiO_2$ nanocomposites with a concentration of less than about 0.05% of weight of the cross-linked PMMA/IL/$TiO_2$ nanocomposites.

In an exemplary embodiment, the IL may include a hydrophilic IL, for example, 1-butyl-3-methylimidazolium tetrafluoroborate ([BMIM] [BF4]). The IL may be present in the cross-linked PMMA/IL/$TiO_2$ nanocomposites with a concentration of at least about 2% of the weight of the cross-linked PMMA/IL/$TiO_2$ nanocomposites.

Step 112 may include forming the $TiO_2$/IL colloid by mixing the $TiO_2$/IL mixture with the surfactant solution. The $TiO_2$/IL mixture may be mixed with the surfactant solution by stirring using a magnetic stirrer over a time period of about 20 minutes. In some exemplary embodiments, the surfactant solution may include one or more surfactants dissolved in a plurality of MMA monomers as a solvent. In an exemplary embodiment, the $TiO_2$/IL colloid may be a stable colloid for a long period of time, for example for several months.

In some exemplary embodiments, the surfactant may be present in the surfactant solution with a concentration of about 0.2 M. The surfactant may include one of Triton X-100, cetyl trimethyl ammonium bromide (CTAB), dioctyl sulfosuccinate sodium (AOT), or combinations thereof. In an exemplary embodiment, the IL may be present in the $TiO_2$/IL colloid with a molar ratio of between 1 and 2 ([IL]:[surfactant]).

Step 114 may include forming the IL/oil microemulsion containing $TiO_2$ nanoparticles by mixing the colloidal $TiO_2$/IL solution with the co-surfactant. In exemplary embodiments, mixing the colloidal $TiO_2$/IL solution with the co-surfactant may be done using a shaker.

In an exemplary embodiment, the co-surfactant may include one of isobutanol, 1-butanol, 2-butanol, acrylic acid, or combinations thereof. The co-surfactant may be present in the IL/oil microemulsion containing $TiO_2$ nanoparticles with a concentration of about 2.24% of the weight of the IL/oil microemulsion containing $TiO_2$ nanoparticles. The IL/oil microemulsion containing $TiO_2$ nanoparticles may be transparent and stable for over several months.

Step 116 may include forming the cross-linked PMMA/IL/$TiO_2$ nanocomposites by cross-linking and polymerizing the MMA monomers. The cross-linking and the polymerizing of the plurality of the MMA monomers may be done simultaneously. In some exemplary embodiments, cross-linking the MMA monomers may be done by adding a cross-linker agent to the IL/oil microemulsion containing $TiO_2$ nanoparticles. The cross-linker agent may include one of ethylene glycol dimethacrylate (EGDMA), triethylene glycol, or combinations thereof. The cross-linker agent may be added with a concentration of between about 0.2% and about 1% of the weight of the MMA monomers.

In some exemplary embodiments, the IL/oil microemulsion containing $TiO_2$ nanoparticles may be stable at a temperature of about 60° C., and the polymerization of the MMA monomers to form PMMA may be done at a temperature of about 60° C. over a time period of about 8 hours. Polymerizing the MMA monomers may be done by adding a polymerization initiator to the IL/oil microemulsion containing $TiO_2$ nanoparticles.

In some exemplary embodiments, the polymerization initiator may have a concentration between about 0.2% and about 1% of the weight of the MMA monomers. The polymerization initiator may include a hydrophobic polymerization initiator, for example, benzoyl peroxide (BPO). In some exemplary embodiments, the PMMA may be present in the cross-linked PMMA/IL/$TiO_2$ nanocomposite with a concentration between about 70% and about 90% of the weight of the cross-linked PMMA/IL/$TiO_2$ nanocomposite.

Figure 1C:
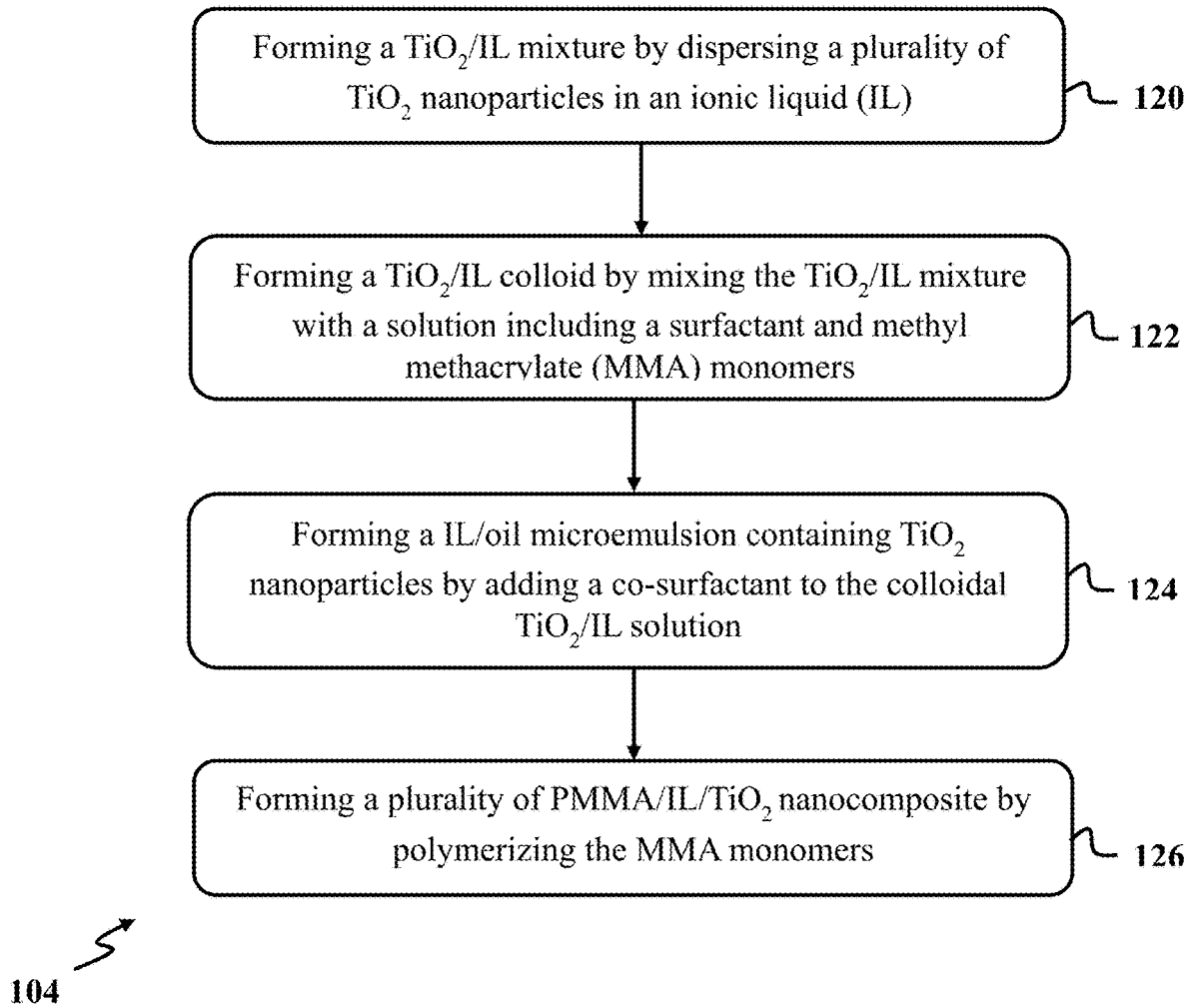
FIG. 1C illustrates a method for forming non-cross-linked polymethyl methacrylate (PMMA)/ionic liquid (IL)/$TiO_2$ nanocomposites, consistent with an exemplary embodiment of the present disclosure.

Step 104 may include forming the non-cross-linked PMMA/IL/$TiO_2$ nanocomposites. FIG. 1C shows an exemplary implementation of step 104 for forming the non-cross-linked PMMA/IL/$TiO_2$ nanocomposites, consistent with an exemplary embodiment of the present disclosure. Forming the non-cross-linked PMMA/IL/$TiO_2$ nanocomposites may include forming a $TiO_2$/IL mixture by dispersing a plurality of $TiO_2$ nanoparticles in an IL (step 120), forming a $TiO_2$/IL colloid by mixing the $TiO_2$/IL mixture with a surfactant solution (step 122), forming a IL/oil microemulsion containing $TiO_2$ nanoparticles by adding a co-surfactant to the colloidal $TiO_2$/IL solution (step 124), and forming the non-cross-linked PMMA/IL/$TiO_2$ nanocomposite by adding a polymerization initiator to the IL/oil microemulsion containing $TiO_2$ nanoparticles (step 126).

Step 120 may include forming the $TiO_2$/IL mixture by dispersing the plurality of $TiO_2$ nanoparticles in the IL. Dispersion of the plurality of $TiO_2$ nanoparticles in the IL may be done using an ultrasonic device until a homogenous $TiO_2$/IL mixture may be obtained.

In some exemplary embodiments, the plurality of $TiO_2$ nanoparticles with a particle size less than about 10 nm, and with a surface area of about 50 $m^2/g$ may be dispersed in the IL; so that, the $TiO_2$ nanoparticles may be present in the non-cross-linked PMMA/IL/$TiO_2$ nanocomposites with a concentration of less than 0.05% of weight of the non-cross-linked PMMA/IL/$TiO_2$ nanocomposites.

In an exemplary embodiment, the IL may be 1-butyl-3-methylimidazolium tetrafluoroborate ([BMIM] [BF4]), and the IL may be present in the non-cross-linked PMMA/IL/$TiO_2$ nanocomposites with a concentration of at least about 2% of the weight of the non-cross-linked PMMA/IL/$TiO_2$ nanocomposites.

Step 122 may include forming the $TiO_2$/IL colloid by mixing the $TiO_2$/IL mixture with the surfactant solution. The $TiO_2$/IL mixture may be mixed with the surfactant solution by stirring using a magnetic stirrer over a time period of about 20 minutes. In some exemplary embodiments, the surfactant solution may include a plurality of surfactant dissolved in a plurality of MMA monomers as a solvent.

In some exemplary embodiments, the surfactant may be present in the surfactant solution with a concentration of about 0.2 M. The surfactant may include one of Triton X-100, cetyl trimethyl ammonium bromide (CTAB), dioctyl sulfosuccinate sodium (AOT), or combinations thereof. In an exemplary embodiment, the IL may be present in the $TiO_2$/IL colloid with a molar ratio of between 1 and 2 ([IL]: [surfactant]).

Step 124 may include forming the IL/oil microemulsion containing $TiO_2$ nanoparticles by mixing the colloidal $TiO_2$/IL solution with the co-surfactant. In some exemplary embodiments, mixing the colloidal $TiO_2$/IL solution with the co-surfactant may be done using a shaker. The co-surfactant may include one of isobutanol, 1-butanol, 2-butanol, acrylic acid, or combinations thereof.

In some exemplary embodiments, the co-surfactant may be present in the IL/oil microemulsion containing $TiO_2$ nanoparticles with a concentration of about 2.24% of the weight of the IL/oil microemulsion containing $TiO_2$ nanoparticles. The IL/oil microemulsion containing $TiO_2$ nanoparticles may be transparent and stable for over several months.

Step 126 may include forming the non-cross-linked PMMA/IL/$TiO_2$ nanocomposites by polymerizing the MMA monomers in the IL/oil microemulsion containing $TiO_2$ nanoparticles. Polymerizing the MMA monomers to form PMMA may be done by adding a polymerization initiator to the IL/oil microemulsion containing $TiO_2$ nanoparticles at a temperature of about 60° C. over a time period of about 8 hours. In some exemplary embodiments, the PMMA may be present in the non-cross-linked PMMA/IL/$TiO_2$ nanocomposite with a concentration of between 70% and 90% of the weight of the non-cross-linked PMMA/IL/$TiO_2$ nanocomposite.

In some exemplary embodiments, the polymerization initiator may have a concentration of between about 0.2% and about 1% of the weight of the MMA monomers. The polymerization initiator may include a hydrophobic polymerization initiator, for example, benzoyl peroxide (BPO).

Referring back to FIG. 1A, step 106 may include forming the photocatalytic filter using the cross-linked and the non-cross-linked PMMA/IL/$TiO_2$ nanocomposites. In some implementations, the cross-linked PMMA/IL/$TiO_2$ nanocomposites may be prepared in form of pellets, which may be visible-light responsive. The cross-linked PMMA/IL/$TiO_2$ nanocomposite pellets may have a synergic effect of adsorption and photocatalysis and may have a porosity between about 50% and about 70%.

In some implementations, the non-cross-linked PMMA/IL/$TiO_2$ nanocomposites may be extruded to produce the photocatalytic vessel, which may be transparent and visible-light responsive. The photocatalytic vessel may be used for passing fluids, such as wastewater inside it. In some implementations, in order to form the photocatalytic filter, the cross-linked PMMA/IL/$TiO_2$ nanocomposite pellets may be placed inside the photocatalytic vessel.

Figure 2:
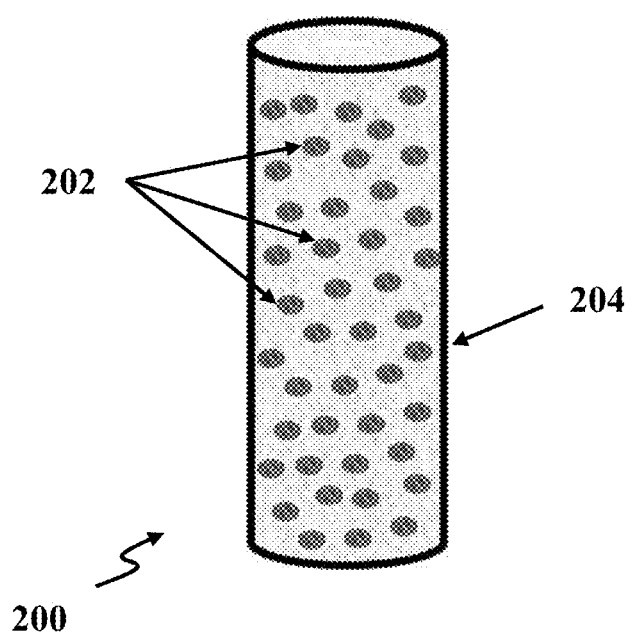
FIG. 2 illustrates a schematic view of an exemplary photocatalytic filter, consistent with an exemplary embodiment of the present disclosure.

FIG. 2 shows a schematic of an exemplary implementation of the photocatalytic filter, consistent with an exemplary embodiment of the present disclosure. The photocatalytic filter 200 may include a plurality of cross-linked PMMA/IL/$TiO_2$ nanocomposite pellets 202 which may be placed inside the photocatalytic vessel 204. The photocatalytic vessel 204 may be made up of the non-cross-linked PMMA/IL/$TiO_2$ nanocomposites.

In some implementations, photocatalytic filter 200 may be used as a cartridge filter for treating wastewater. The wastewater may pass through the photocatalytic vessel 204 of photocatalytic filter 200, and pollutants of the wastewater, such as different dyes, organic substances, and microorganisms may be removed by degradation under visible-light by photocatalysis of photocatalytic vessel 204 and cross-linked PMMA/IL/$TiO_2$ pellets 202. In an exemplary embodiment, pollutants of the wastewater may be further removed by adsorption by cross-linked PMMA/IL/$TiO_2$ pellets 202.

It should be noted that photocatalytic filter 200 may be an environmental-friendly filter and may be used for highly efficient low-cost purification, adsorption-photocatalytic oxidation for strong water bacteria, and killing viruses and algae. Moreover, the photocatalytic filter 200 may be used for removing different pollutants from wastewater, such as hydrocarbons, halogenated organic compounds, carboxylic acids, surface active agent, nitrogen-containing compounds, organic phosphorus, cyanide ions, metal ions, pesticides, chloroform, PCBs, polycyclic aromatic hydrocarbons, and other organic and inorganic pollutants.

EXAMPLES

Example 1: Morphological Characterization

Figure 3A:
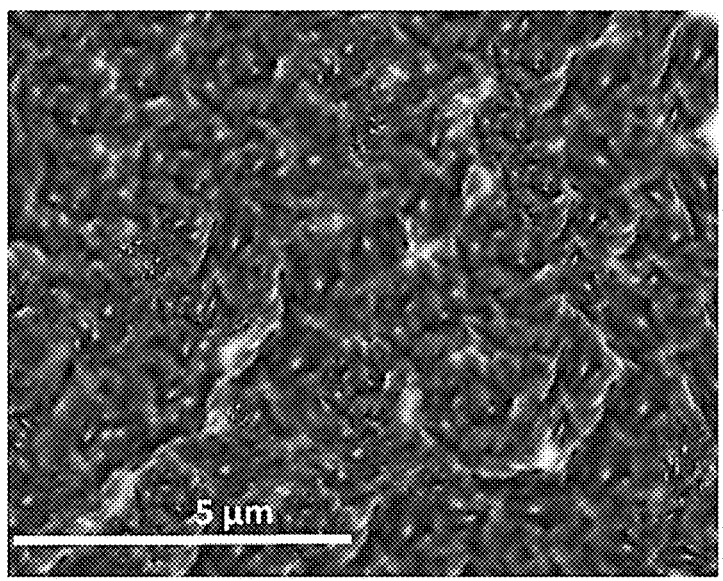
FIG. 3A illustrates a scanning electron microscopy (SEM) image of the non-cross-linked PMMA/IL/$TiO_2$ nanocomposites, consistent with an exemplary embodiment of the present disclosure.

In this example, morphological characterization of an exemplary cross-linked PMMA/IL/$TiO_2$ nanocomposite and an exemplary non-cross-linked PMMA/IL/$TiO_2$ nanocomposite, which were prepared as described in the present disclosure, was studied using electron microscopy. FIG. 3A shows a scanning electron microscopy (SEM) image of a non-cross-linked PMMA/IL/$TiO_2$ nanocomposite, consistent with an exemplary embodiment of the present disclosure.

Figure 3B:
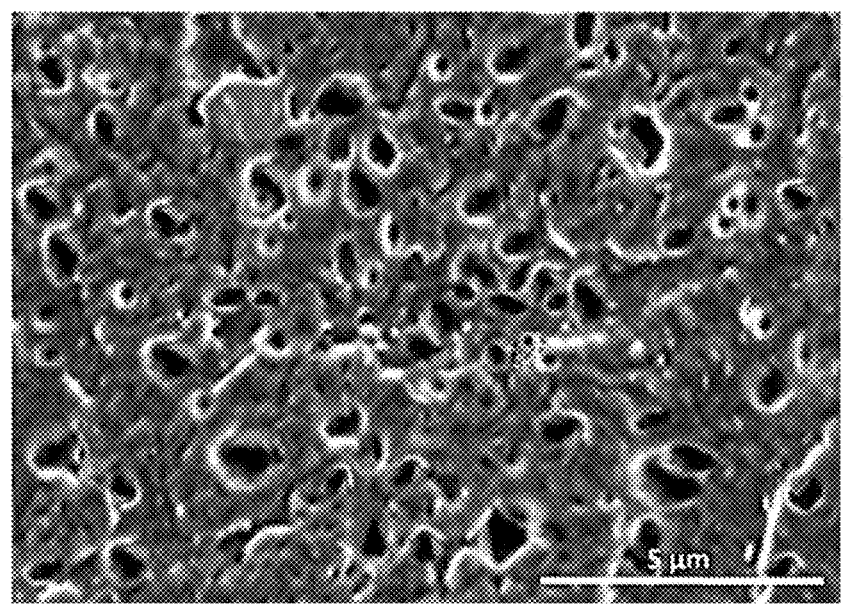
FIG. 3B illustrates a SEM image of the cross-linked PMMA/IL/$TiO_2$ nanocomposites, consistent with an exemplary embodiment of the present disclosure.

FIG. 3B shows an SEM image of a cross-linked PMMA/IL/$TiO_2$ nanocomposite, consistent with an exemplary embodiment of the present disclosure. Referring to FIG. 3B, the cross-linked PMMA/IL/$TiO_2$ nanocomposite has a porous structure with a homogenous morphology. The pore size of the cross-linked PMMA/IL/$TiO_2$ nanocomposite is between about 40 μm and about 100 μm.

Referring to FIGS. 3A and 3B, the $TiO_2$ nanoparticles with a spherical morphology are homogeneously dispersed in the PMMA matrix. While not being bound by any theory, the high dispersity of the exemplary $TiO_2$ nanoparticles in the PMMA matrix may correspond with the use of the ionic liquid in the IL/oil microemulsion. The role of the ionic liquid as a dispersant may be described as follows. The $TiO_2$ nanoparticles have acceptable structural interactions with IL molecules. Also, the IL molecules are compatible with MMA monomers due to the existence of huge organic cations in the MMA monomers.

Figure 4A:
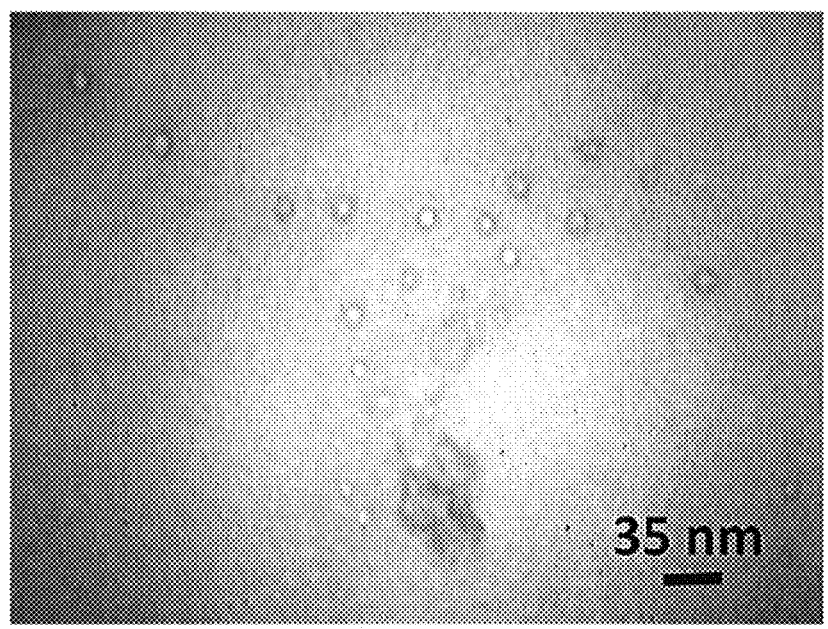
FIG. 4A illustrates a transmission electron microscopy (TEM) image of the non-cross-linked PMMA/IL/$TiO_2$ nanocomposites, consistent with an exemplary embodiment of the present disclosure.

FIG. 4A shows a transmission electron microscopy (TEM) image of the exemplary non-cross-linked PMMA/IL/$TiO_2$ nanocomposite, consistent with an exemplary embodiment of the present disclosure. Referring to FIG. 4A, there is not any aggregation of the $TiO_2$ nanoparticles of the non-cross-linked PMMA/IL/$TiO_2$ nanocomposite, and the $TiO_2$ nanoparticles show a high level of monodispersity with a uniform particle size of about 11 nm.

Figure 4B:
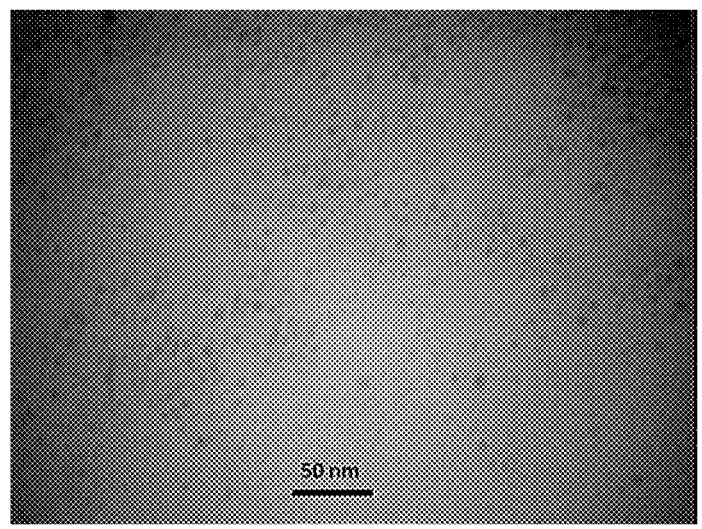
FIG. 4B illustrates a TEM image of the cross-linked PMMA/IL/$TiO_2$ nanocomposites, consistent with an exemplary embodiment of the present disclosure.

FIG. 4B shows a transmission electron microscopy (TEM) image of the exemplary cross-linked PMMA/IL/$TiO_2$ nanocomposite, consistent with an exemplary embodiment of the present disclosure. Referring to FIG. 4B, there is not any aggregation of the $TiO_2$ nanoparticles and the $TiO_2$ nanoparticles show a high level of monodispersity with a uniform particle size.

While not being bound by any theories, the exemplary cross-linked PMMA/IL/$TiO_2$ nanocomposite exhibit a structure of core-shell microspheres which are wrapped in the PMMA polymeric matrix. The core-shell microspheres may be obtained in presence of the hydrophilic IL, and each microsphere may have a ring of Titania as a shell and a soft IL domain as a core. The ring of Titania forms darker region around the brighter region of the IL core.

Example 2: UV-Visible Diffuse Reflectance Spectroscopy

Figure 5:
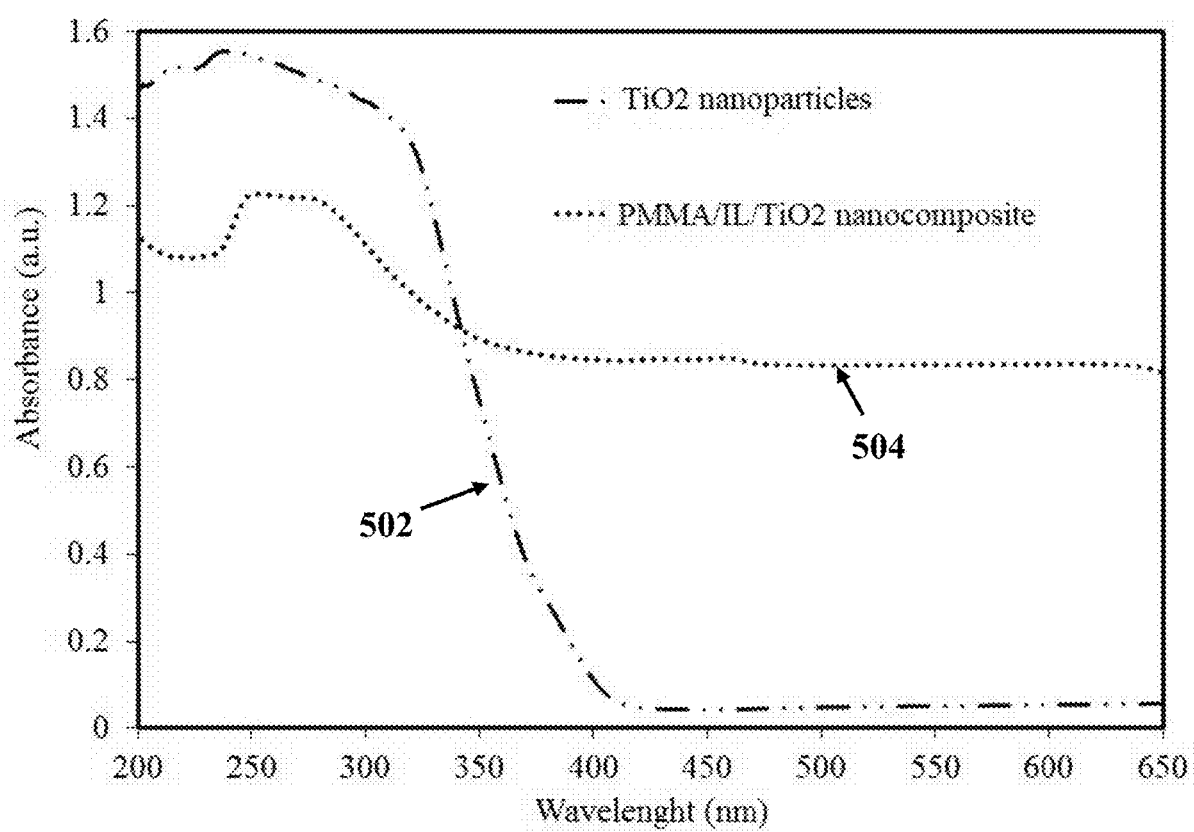
FIG. 5 illustrates UV-Visible diffuse reflectance (UV-Vis/DRS) spectra of $TiO_2$ nanoparticles and the non-cross-linked PMMA/IL/$TiO_2$ nanocomposite, consistent with an exemplary embodiment of the present disclosure.

In this example, band-gap energies of the exemplary non-cross-linked PMMA/IL/$TiO_2$ nanocomposite were determined using a UV-Visible diffuse reflectance spectroscopy (UV-Vis/DRS). UV-visible diffuse reflectance spectroscopy (UV-DRS) of the non-cross-linked PMMA/IL/$TiO_2$ nanocomposite was done at room temperature in the wavelength range of about 200 nm to 600 nm using a UV-Vis/near-infrared region (NIR) spectrophotometer. FIG. 5 shows UV-Visible diffuse reflectance (UV-Vis/DRS) spectra of $TiO_2$ nanoparticles 502 and non-cross-linked PMMA/IL/$TiO_2$ nanocomposite 504, consistent with an exemplary embodiment of the present disclosure.

Referring to FIG. 5, comparison between the UV-Vis/DRS spectra of $TiO_2$ nanoparticles 502 and non-cross-linked PMMA/IL/$TiO_2$ nanocomposite 504 reveals that the band gap of the non-cross-linked PMMA/IL/$TiO_2$ nanocomposite 504 is equal to about 2.57 eV, and the absorbance of non-cross-linked PMMA/IL/$TiO_2$ nanocomposite 504 is shifted greatly towards the visible region, particularly towards red light. The shift of the absorption edge of the non-cross-linked PMMA/IL/$TiO_2$ nanocomposite towards the visible region may be due to the presence of hydrophilic IL molecules, which are used as a substitute for water to create the IL/oil microemulsion, and may relate to the interactions between the IL molecules and the $TiO_2$ nanoparticles.

Example 3: Fourier Transform-Infrared Spectroscopy

In this example, Fourier transform-infrared (FT-IR) spectroscopy was done for an exemplary non-cross-linked PMMA/IL/$TiO_2$ nanocomposite and an exemplary cross-linked PMMA/IL/$TiO_2$ nanocomposite, which were prepared according to the disclosed methods hereinabove. The samples of each nanocomposite were prepared by mixing the non-cross-linked and the cross-linked PMMA/IL/$TiO_2$ nanocomposite with a plurality of potassium bromide (KBr) with a purity of about 99% and in a mass ratio of about 1:100. Samples were mixed homogeneously with a shaker for about 20 seconds prior to forming pellets of nanocomposites for performing the FT-IR analysis.

Figure 6:
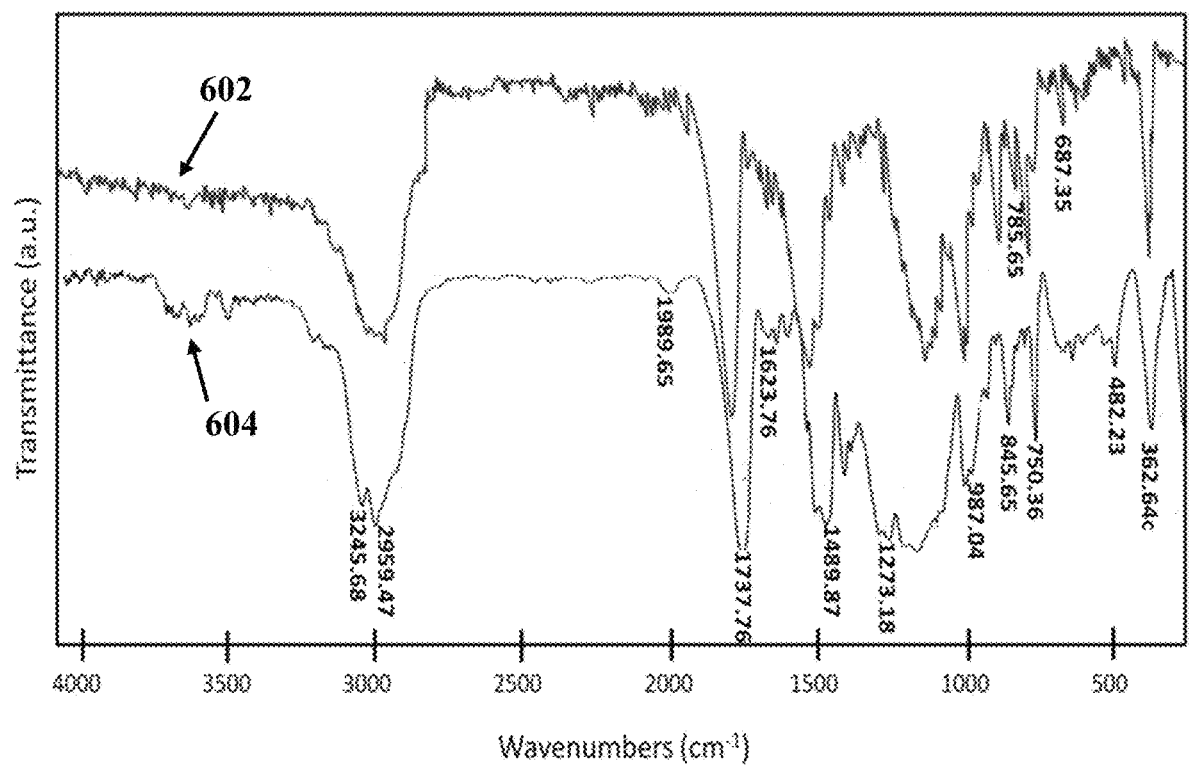
FIG. 6 illustrates Fourier-transform infrared (FT-IR) spectra of the cross-linked PMMA/IL/$TiO_2$ nanocomposites (top) and the non-cross-linked PMMA/IL/$TiO_2$ nanocomposites (bottom), consistent with an exemplary embodiment of the present disclosure.

FIG. 6 shows FT-IR spectra of cross-linked PMMA/IL/$TiO_2$ nanocomposite (top-602) and the non-cross-linked PMMA/IL/$TiO_2$ nanocomposites (bottom-604), consistent with an exemplary embodiment of the present disclosure. Referring to FIG. 6, in both spectra 602 and 604, a sharp intense peak at a wavelength about 1737 $cm^{-1}$ appeared due to the presence of ester carbonyl group stretching vibration. Also, C—H stretching in C—$CH_3$ groups of the PMMA is observed at a wavelength about 2953 $cm^{-1}$.

Referring again to FIG. 6, in spectrum 602 of the cross-linked PMMA/IL/$TiO_2$ nanocomposite, the peaks at wavelengths of about 687 $cm^{-1}$ and about 785 $cm^{-1}$ are characteristic peaks for poly (EGDMA), which is the cross-linker agent. The broad peak at wavelengths ranging from about 1260 $cm^{-1}$ to about 1000 $cm^{-1}$ appeared due to the ester bond stretching vibration. The broadband from about 950 $cm^{-1}$ to about 650 $cm^{-1}$ is due to the bending of C—H groups. The broad peak at wavelengths ranging from about 3100 $cm^{-1}$ and about 2900 $cm^{-1}$ is due to the presence of stretching vibration.

Referring again to FIG. 6, there are a significant increase in the peak intensity and a little shift at wavelength of about 1737 $cm^{-1}$ in spectra 602 of the cross-linked PMMA/IL/$TiO_2$ in comparison with the spectrum 604 of the non-cross-linked PMMA/IL/$TiO_2$, which may be attributed to the interaction between two carbonyl groups in the PMMA matrix and the poly (EGDMA).

Example 4: Thermo-Gravimetric Analysis

Figure 7:
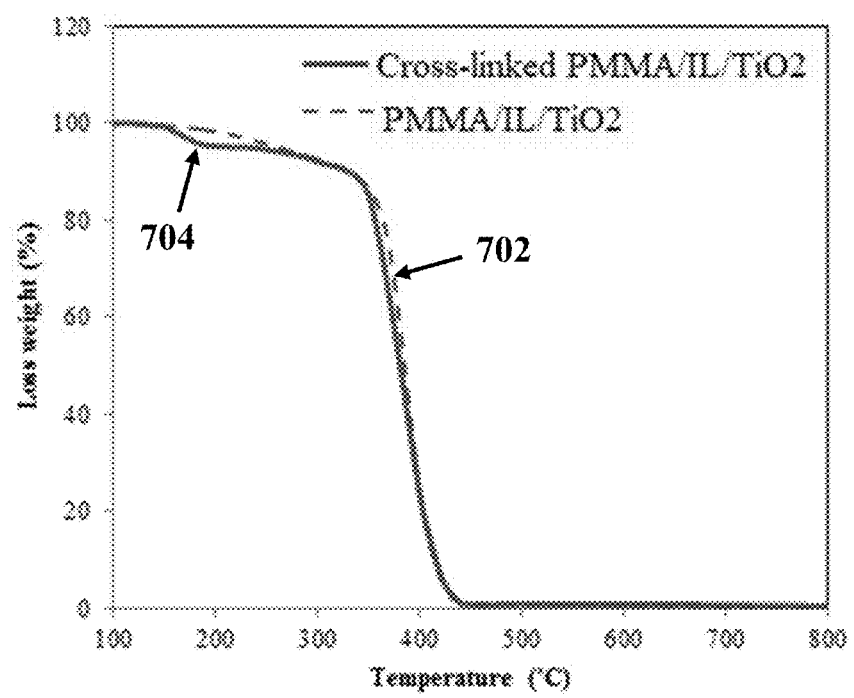
FIG. 7 illustrates thermo-gravimetric analysis (TGA) spectra of the non-cross-linked PMMA/IL/$TiO_2$ nanocomposites and cross-linked PMMA/IL/$TiO_2$ nanocomposites, consistent with an exemplary embodiment of the present disclosure.

In this example, thermal characteristics of exemplary non-cross-linked PMMA/IL/$TiO_2$ nanocomposite and cross-linked PMMA/IL/$TiO_2$ nanocomposites were investigated in a non-isothermal thermo-gravimetric analysis (TGA). The measurements were conducted at heating rates of about 10° C./min under nitrogen flow at a constant flow rate 20 $cm^3$/min at a temperature of between about 100° C. and about 600° C. FIG. 7 shows TGA spectra of non-cross-linked PMMA/IL/$TiO_2$ nanocomposite 702 and the cross-linked PMMA/IL/$TiO_2$ nanocomposite 704, consistent with an exemplary embodiment of the present disclosure.

Referring to FIG. 7, the TGA spectra show a single-step degradation which relates to the thermal decomposition of the PMMA matrix in a depolymerization process. The degradation temperature of each nanocomposite is slightly shifted to higher values in the presence of $TiO_2$ nanoparticles. The shift towards higher temperatures may relate to the interaction between the $TiO_2$ nanoparticles and the PMMA matrix, which may lead to immobilization of free radical chains and/or may hinder the diffusion of volatile decomposition products. The weight loss of the non-cross-linked PMMA/IL/$TiO_2$ nanocomposite is about 85.49% at a temperature of between about 340° C. and about 440° C.

Referring again to FIG. 7, the onset temperature of PMMA decomposition for the non-cross-linked PMMA/IL/$TiO_2$ nanocomposite is shifted towards higher temperatures. The shift towards higher temperatures may relate to network improvement of PMMA polymeric chains by the IL molecules. The IL molecules may restrain the movement of free radicals and consequently, the nanocomposites may have more thermal stability.

The thermogram of the cross-linked PMMA/IL/$TiO_2$ nanocomposite 704 demonstrated almost similar result to the non-cross-linked PMMA/IL/$TiO_2$ nanocomposite 702. Reasonably the cross-linked PMMA/IL/$TiO_2$ nanocomposite has an additional loss weight attributed to the loss of the water molecules which were adsorbed on the surface of the cross-linked PMMA/IL/TiO$_2$ nanocomposite at a temperature about 180° C.

Example 5: Swelling Studies of the Cross-Linked PMMA/IL/Tio$_2$ Nanocomposite In this example, swelling characteristics of exemplary cross-linked PMMA/IL/TiO$_2$ nanocomposite was studied by monitoring the water absorbency of the cross-linked PMMA/IL/TiO$_2$ nanocomposite. The pre-weighted sample of the cross-linked PMMA/IL/TiO$_2$ nanocomposite which was completely dried was placed in 200 ml distilled water beaker at laboratory temperature and at different pH levels from 5 to 9 in dark conditions.

Subsequently, the swollen sample of the cross-linked PMMA/IL/TiO$_2$ nanocomposite was taken out at different time intervals and weighted. Then, the sample was put in beaker medium again for further swelling. The mass measurements at corresponded time interval were repeated until the cross-linked PMMA/IL/TiO$_2$ nanocomposite attained a constant weight. The Equation (1) was used to determine the percentage of swelling.

$$\text{Percentage of swelling} = \frac{M_t - M_0}{M_0} \times 100 \quad \text{Equation (1)}$$

Where M$_0$ is the initial mass of cross-linked PMMA/IL/TiO$_2$ nanocomposite, and M$_t$ is the mass of cross-linked PMMA/IL/TiO$_2$ nanocomposite at different time intervals.

At the same time, the swelling behavior was studied for non-cross-linked PMMA/IL/TiO$_2$ nanocomposite. The non-cross-linked PMMA/IL/TiO$_2$ nanocomposite did not show any swelling effect because non-cross-linked PMMA/IL/TiO$_2$ nanocomposite does not have a porous structure for absorbing water.

Figure 8:
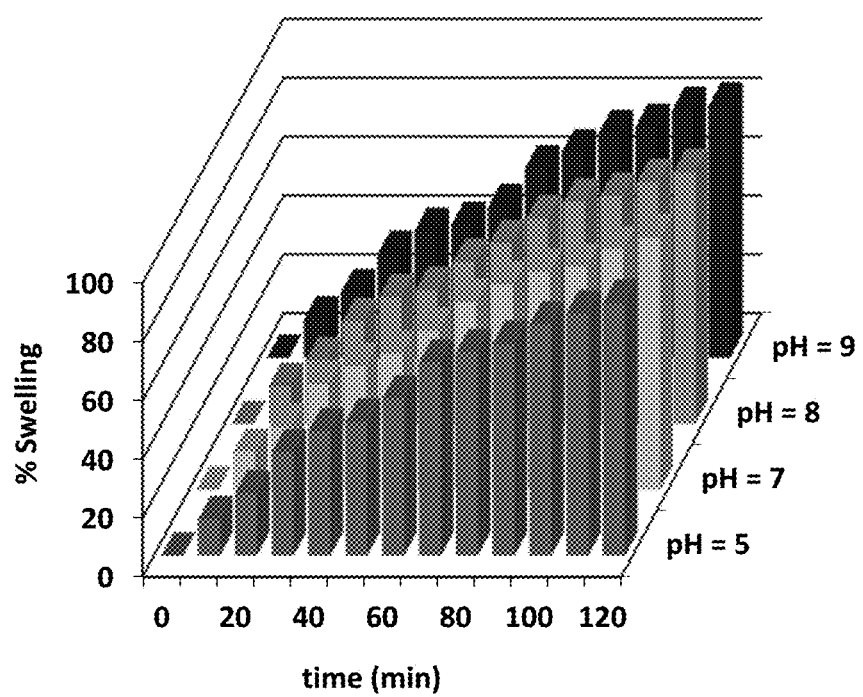
FIG. 8 illustrates a water uptake behavior of the cross-linked PMMA/IL/$TiO_2$ nanocomposites at different pH levels, consistent with an exemplary embodiment of the present disclosure.

FIG. 8 shows the swelling behavior of cross-linked PMMA/IL/TiO$_2$ nanocomposite at different pH, consistent with an exemplary embodiment of the present disclosure. It may be observed that the swelling percentage of cross-linked PMMA/IL/TiO$_2$ nanocomposite is about 87% after about 2 hours of exposure to water. Moreover, it is shown that the water absorption is independent of pH. The results may be attributed to the porous structure of cross-linked PMMA/IL/TiO$_2$ nanocomposite.

In addition, the cross-linked PMMA/IL/TiO$_2$ nanocomposite possesses a high swelling capacity in water due to the hydrophilic nature of cross-linked units; therefore, the network of the cross-linked PMMA/IL/TiO$_2$ nanocomposite is sufficiently expanded to allow a fast diffusion of the adsorbates to the pores.

Example 6: Application of the Photocatalytic Filter for Wastewater Treatment In this example, exemplary prepared photocatalytic filter was used for treating wastewater in a form of a cartridge filter. The wastewater stream included methylene blue (MB) dye which was removed using adsorption and photocatalysis processes.

Figure 9:
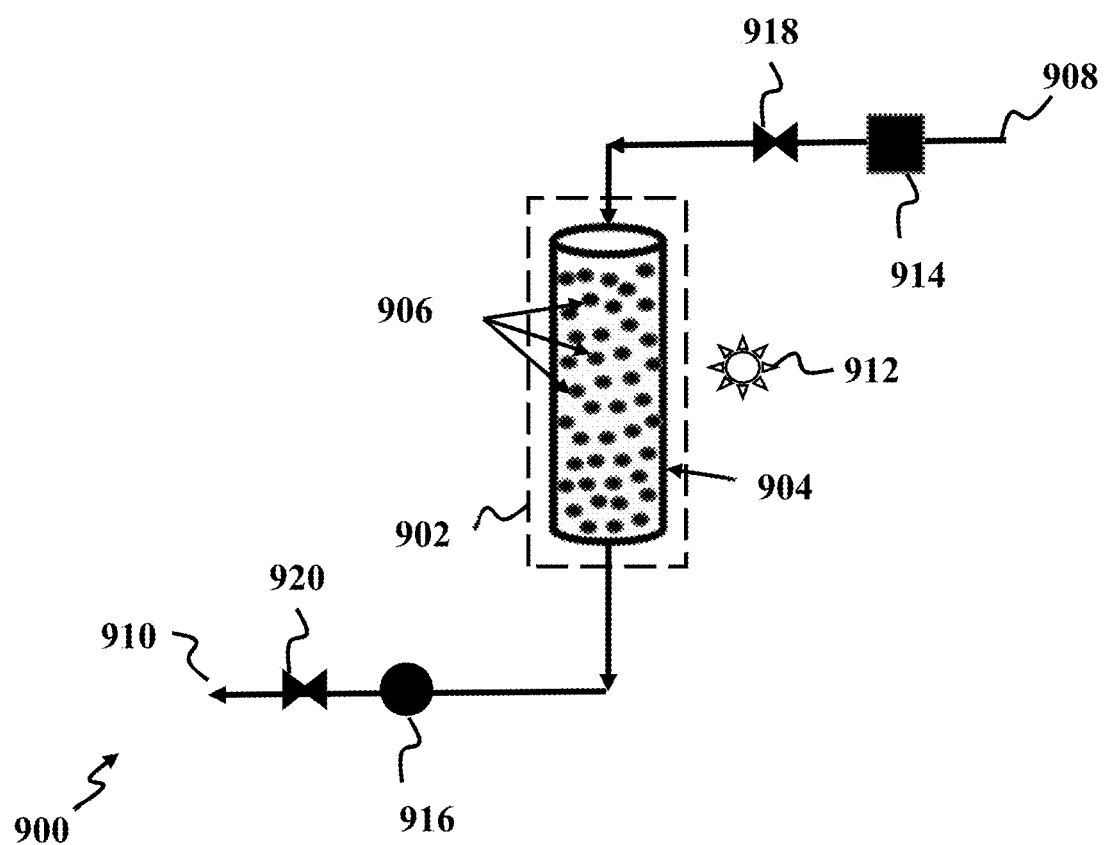
FIG. 9 illustrates a schematic setup of a wastewater treatment reactor, consistent with an exemplary embodiment of the present disclosure.

FIG. 9 shows a schematic setup 900 of a wastewater treatment reactor which includes photocatalytic filter 902 equipped with inlet 908 and outlet 910 under visible-light irradiation of xenon lamp 912, consistent with an exemplary embodiment of the present disclosure. Passage of the wastewater stream through the wastewater treatment reactor was controlled by pump 914, water meter 916, and two faucets 918 and 920. The photocatalytic filter 902 included a photocatalytic vessel 904 which was made up of transparent visible-light responsive non-cross-linked PMMA/IL/TiO$_2$ nanocomposite. The photocatalytic vessel 904 with a length of about 20 cm and an inner diameter of about 5 cm was filled with 30 grams of the cross-linked PMMA/IL/TiO$_2$ nanocomposite pellets 906. The filled volume is equal to two-thirds of the total capacity of the photocatalytic filter 902.

The wastewater treatment reactor was placed inside a wooden box with a black color; so that no stray light may enter the reactor. The MB removal was carried out isothermally at 25° C., and samples of the reaction mixture were analyzed at different time intervals for a total reaction time of 1 hour. During the adsorption-photocatalysis process, the UV-visible spectra of the reaction mixture were recorded at intervals of 10 min.

In order to evaluate the adsorption process of the photocatalytic filter 902, a wastewater stream with a flow rate between about 1 m/s and about 3 m/s was passed through the photocatalytic vessel 904 for adsorption of MB in dark condition by the cross-linked PMMA/IL/TiO$_2$ nanocomposite pellets 906 which were used as adsorbents. After adsorption, in order to confirm the photocatalytic activity of the photocatalytic filter 902, the photodegradation of MB dye was done by passing the wastewater stream through the photocatalytic vessel 904 under visible light irradiation of xenon lamp 912, and with a flow rate of between about 1 m/s and about 3 m/s.

During the passage of the wastewater stream through the photocatalytic vessel 904, the MB was degraded by the photocatalytic activity of the photocatalytic vessel 904 and the cross-linked PMMA/IL/TiO$_2$ nanocomposite pellets 906 which were used as photocatalysts During the photocatalysis process, the photocatalytic filter was irradiated by visible-light with a xenon lamp 912 which was double-coated with a UV cut filter. The xenon lamp has a power of 300 W, and it was attached vertically at the top. The distance between the xenon lamp 912 and the photocatalytic filter 902 was fixed at 10 cm. The intensity of UV light was kept under the detection limit of a UV radiometer which is about 0.1 mW/cm2.

Combination of adsorption and photocatalysis processes in the photocatalytic filter 902 makes it useful for a long-time operation. In some implementations, the photocatalytic may be widely used in industrial and municipal wastewater treatment, handling garbage permeate, large power plants, oil refineries of industrial circulating water reclamation and reuse, water oil field water garden estate, artificial lakes, and other water bodies landscape disinfection.

Example 7: Adsorption and Photocatalysis Behaviors of the Photocatalytic Filter In this example, adsorption and photocatalysis behaviors of the photocatalytic filter were investigated by determining the effect of pH, initial dye concentration, and initial adsorbate concentration. Moreover, equilibrium of the MB adsorption was studied by modeling.

Figure 10A:
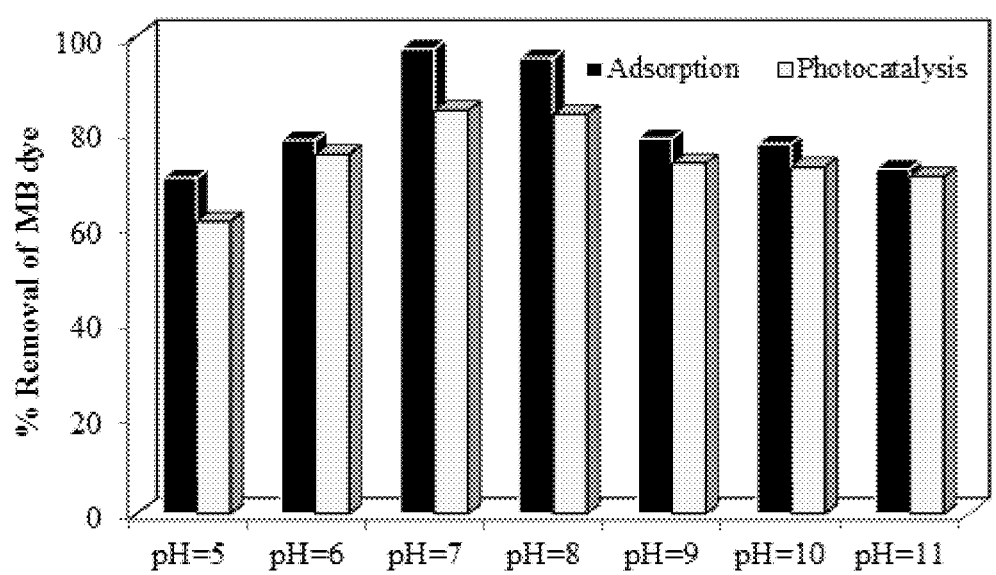
FIG. 10A illustrates efficiencies of utilizing an exemplary photocatalytic filter for removing methylene blue (MB) dye in dark and light conditions at different pH levels, consistent with an exemplary embodiment of the present disclosure.

The effect of pH on adsorption and photocatalysis activities of the cross-linked PMMA/IL/TiO$_2$ were investigated. FIG. 10A shows efficiencies of the cross-linked PMMA/IL/TiO$_2$ nanocomposite for removing methylene blue (MB) dye in dark and light conditions at different pH, consistent with an exemplary embodiment of the present disclosure.

The effect of pH on the adsorption capacity of the cross-linked and non-cross-linked PMMA/IL/TiO$_2$ nanocomposite for MB adsorption was investigated at a temperature of about 20° C. in dark condition during 120 minutes at pH levels between 5 and 9 by using the same amounts of the cross-linked and non-cross-linked PMMA/IL/TiO$_2$ for a comparative study.

In order to begin the adsorption activity, the desired amount of the cross-linked PMMA/IL/TiO$_2$ nanocomposite was placed in a beaker including MB solution with a fixed concentration of 12 mg/L. The pH of MB solution was adjusted by adding either HCl or NaOH.

Subsequently, the supernatant of the MB solution was collected after 2 hours and analyzed by UV-Vis spectroscopy. In all cases, most of the MB adsorption occurred within 15 minutes but in order to ensure a proper equilibrium of adsorption, all of the adsorption experiments were carried out for 20 minutes.

Referring to FIG. 10A, it is shown that the adsorption of MB dye is dependent on pH, and the highest MB adsorption is obtained at a pH level of 8, which may be due to electrostatic attractions between the cationic molecules of MB and negatively charged carboxyl groups of poly (EGDMA).

Referring again to FIG. 10A, the effect of pH on the photocatalysis activity of the cross-linked and non-cross-linked PMMA/IL/TiO$_2$ nanocomposite for MB removal was investigated under visible-light irradiation, at a temperature of about 20° C. for 120 minutes at pH levels between 5 and 9 by using the same amounts of the cross-linked and non-cross-linked PMMA/IL/TiO$_2$ nanocomposites for a comparative study.

It must be noted that the pH level of 9 is more than the pH$_{zpc}$ of the TiO$_2$ nanoparticles, and the surface of the TiO$_2$ nanoparticles in the cross-linked PMMA/IL/TiO$_2$ nanocomposite is negatively charged in the Ph level of 9; therefore, electrostatic attractions may be increased between the surface of TiO$_2$ nanoparticles and the cationic molecules of MB, and adsorption of the MB dye will be increased.

Figure 10B:
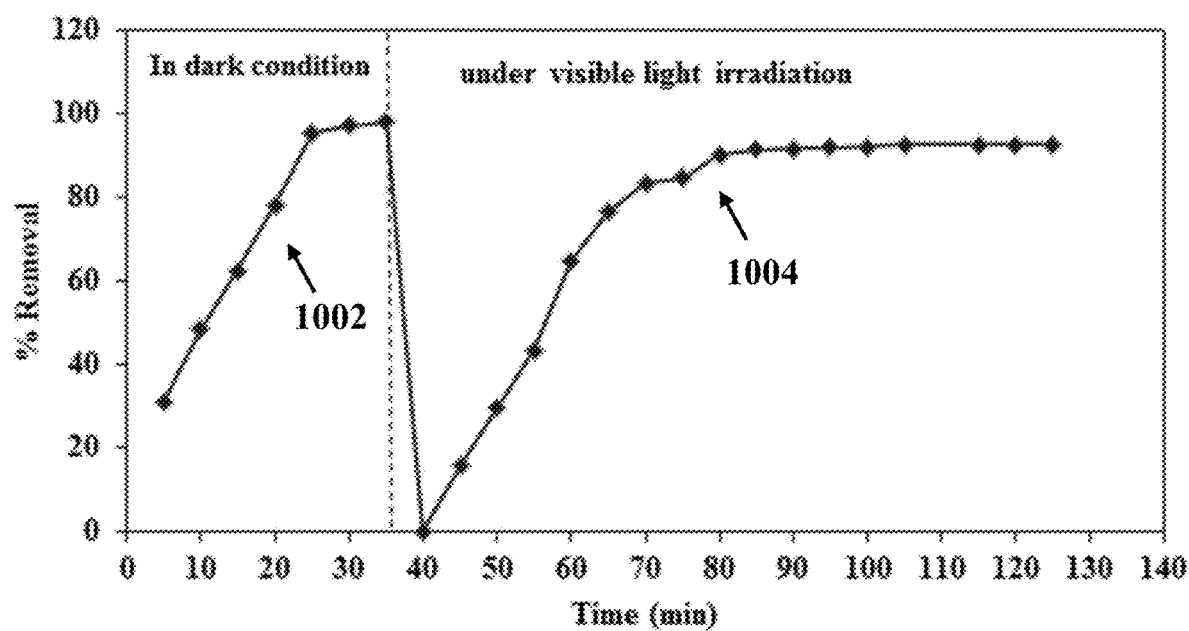
FIG. 10B illustrates kinetics of MB removal using an exemplary photocatalytic filter in dark and light conditions, consistent with an exemplary embodiment of the present disclosure.

FIG. 10B shows kinetics of the cross-linked PMMA/IL/TiO$_2$ nanocomposite for adsorption MB dye in dark and light conditions, consistent with an exemplary embodiment of the present disclosure. Referring to FIG. 10B, the maximum values of adsorption-photocatalysis of MB dye was about 0.90. The high percentage of MB removal is corresponding to the porous structure of the cross-linked PMMA/IL/TiO$_2$ nanocomposite which is responsible for remarkable high adsorption capacity. The percentage of MB removal by the cross-linked PMMA/IL/TiO$_2$ nanocomposite was calculated by Equation 2, and the maximum removal of MB dye was up to 80%. MB removal $$(\%) = \frac{C_0 - C_t}{C_0} \times 100. \qquad \text{Equation (2)}$$

However, the non-cross-linked PMMA/IL/TiO$_2$ nanocomposite did not show any MB adsorption after 20 minutes in dark conditions, because the non-cross-linked PMMA/IL/TiO$_2$ nanocomposite has a non-porous structure which has a fair or no tendency for adsorption of MB dye.

Referring again to FIG. 10B, the cross-linked and non-cross-linked PMMA/IL/TiO$_2$ nanocomposites show similar results for the photocatalytic activity, and the highest photocatalytic activity for the photodegradation of MB dye was obtained at a pH level of 8. Therefore, the cross-linked PMMA/IL/TiO$_2$ nanocomposite is effective for removal of cationic dyes, such as MB dyes from aqueous solutions by a hybrid process of adsorption-photocatalysis, and may be utilized as an adsorbent for environmental applications.

Example 8: Modeling the Equilibrium of Mb Adsorption by the Cross-Linked PMMA/IL/TiO$_2$ Nanocomposite In this example, modeling of equilibrium MB adsorption was studied. The equilibrium adsorption isotherm models have principal importance in the design of adsorption for determining MB adsorption behavior. It may be described that in a batch technique, equilibrium is established between the liquid phase of the MB dye solution and solid phase of the adsorbent cross-linked PMMA/IL/TiO$_2$ nanocomposite. The adsorption experiments were carried out in the concentration range of the dye ranging from 4 mg/ml to 40 mg/ml at a fixed pH level of 8. It must be noted that all of the adsorption isotherm models were studied at a fixed temperature. The non-cross-linked PMMA/IL/TiO$_2$ nanocomposite due to the non-porous structure was not carried out in the adsorption experiments.

At first, the effect of initial dye concentration as an adsorbate on adsorption behavior was determined as follows. The adsorption study of MB dye solution was carried out by batch technique. In order to begin the adsorption activity, the desired amount of the cross-linked PMMA/IL/TiO$_2$ nanocomposite was placed in a beaker including MB solution with a concentration between 4 mg/ml and 40 mg/ml. The beakers were then agitated on a wooden box at a temperature of about 20° C. at a pH level of 8 in dark condition for about 15 minutes to establish adsorption. Subsequently, the supernatant of the MB solution was collected and analyzed for determining the concentration of the remained MB dye using UV-Vis spectroscopy.

The concentration of the remained MB dye was monitored using a spectrophotometer at a wavelength of 430 nm. After 15 minutes, which is the equilibrium time, the amount of the adsorbed MB dye on the sample adsorbent is q$_e$. At another time, the amount of the adsorbed MB dye is q$_t$. The q$_e$ and the q$_t$ were calculated using the following Equations (3) and (4).

$$q_e = \frac{V(C_0 - C_e)}{m}, \qquad \text{Equation (3)}$$

$$q_t = \frac{V(C_0 - C_t)}{m}, \qquad \text{Equation (4)}$$

where, C$_0$, C$_t$, and C$_e$ are the initial, final dye and the dye concentration at equilibrium (mg L$^{-1}$), respectively. V is the volume of the MB dye solution (L), and m is the mass of the cross-linked PMMA/IL/TiO$_2$ nanocomposite adsorbent that was used (g).

The values of q$_e$ (mg/g) were calculated and the plot of C$_e$ versus q$_e$ was drawn, and the data revealed that the obtained isotherm typically belongs to L2 type i.e. Langmuir type of adsorption isotherm. It must be noted the stronger interaction between the MB dye molecules and the active site of the porous cross-linked PMMA/IL/TiO$_2$ nanocomposite was obtained at the pH level of 8. Therefore the MB dye adsorption may probably be attributed to the fact that the adsorption is occurring via physical adsorption.

The Langmuir adsorption isotherm model was used for modeling the equilibrium of MB adsorption. The Langmuir isotherm model is given as Equation (5):

$$\frac{C_e}{Q_e} = \frac{1}{K_L Q_0} + \frac{C_e}{Q_0},$$

where qe (mg/g) is the amount of solute adsorbed per unit of the cross-linked PMMA/IL/TiO$_2$ nanocomposite in the photocatalytic filter at equilibrium. Ce (mg/L) is the equilibrium concentration (mg/L), $K_L$ (L/mg) is the Langmuir constant related to the energy of adsorption, and $Q_0$ value (mg/g) is the limiting adsorption capacity of adsorption corresponding to complete monolayer coverage as a principle of Langmuir isotherm model.

Another important principle of Langmuir isotherm model is the assumption of a structurally homogenous adsorbent and monolayer coverage with no interaction between the MB dye molecules. The plot of $C_e/Q_e$ versus $C_e$ exhibit linearity with a fair linear regression of 0.9992 at a fixed temperature. The obtained results show that the adsorption of the MB dye in accordance with the Langmuir isotherm. The $K_L$ and $Q_0$ values were calculated from the intercept and slope of the Langmuir plot which was found to be 118.87 (mg/g) and 10.12 (L/mg), respectively.

The essential feature of the Langmuir isotherm may be expressed in terms of a dimensionless constant called separation factor (RL, also named equilibrium parameter) which is defined by RL=1/1+aL C0: where $C_0$ is the initial concentration (mg L$^{-1}$) and aL is the Langmuir constant related to the energy adsorption (L mg$^{-1}$). The value of RL indicates the shape of the Langmuir isotherm which may be either unfavorable (RL>1) or linear (RL=1) or favorable (0<RL<1) or irreversible (RL=0). The value of RL for MB adsorption onto the cross-linked PMMA/IL/TiO$_2$ nanocomposite in the photocatalytic filter ranges between 0.040 and 0.431, confirming the favorable uptake of the dye. The calculated aL is 0.0705 (L/mg).

The Freundlich adsorption isotherm model was also studied for modeling the equilibrium of MB adsorption. The Freundlich adsorption model may be expressed by following Equation (6): $q_e = K_F C_e^{1/n}$. The Equation (6) may be represented in the logarithmic form by Equation (7), in which the validity of the Freundlich isotherm model was proved by following logarithmic relation. Equation (7):

$$\log Q_e = \log K_F + \frac{1}{n} \log C_e,$$

where $q_e$ is the solid phase equilibrium concentration (mg/g), $C_e$ is liquid phase equilibrium concentration (mg/L), $K_F$ (mg/g(L/mg)1/n), and n are Freundlich constant which indicates the adsorption capacity and adsorption intensity. In other word n giving an indication of the facility, which MB adsorption process takes place.

The plot of log $C_e$ versus log $q_e$ is linear with a linear regression of 0.9989 at the fixed temperatures. The values of Freundlich constants, derived from the slopes and intercepts of log $C_e$ versus log $q_e$, ($K_F$ and nF) were 105.033 (L/mg) and 86.083, respectively. As the value of nF lies between 2 and 10 which indicates a fair MB adsorption onto cross-linked PMMA/IL/TiO$_2$ nanocomposite adsorbent at laboratory temperature. It is generally stated that value of n in the range of 2 to 10 represents good, 1 to 2 represents moderately difficult and less than 1 represents poor adsorption characteristics.

The obtained linear regression value was low as compared to the linear regression obtained from Langmuir model. It may be inferred that the MB adsorption is best interpreted in the terms of Langmuir isotherm model, indicating that a monolayer occurs on the distributed active sites and pores of cross-linked PMMA/IL/TiO$_2$ nanocomposite in the photocatalytic filter during the adsorption process.

Moreover, adsorption kinetics of the cross-linked PMMA/IL/TiO$_2$ nanocomposite was studied as follows. The studies of adsorption kinetics were performed at laboratory temperature with a certain amount of MB solution with different concentrations of 8 mg/L, 12 mg/L, and 30 mg/L at a pH level of 7.2 in dark condition.

In order to evaluate the kinetic mechanism which controls the MB dye adsorption using the cross-linked PMMA/IL/TiO$_2$ nanocomposite, two models including pseudo-first-order, pseudo-second-order, and the intra-particle diffusion were analyzed according to Equations 8 to 10:

$$\log(q_e - q_t) = \log q_e - \frac{k_1}{2.303} t, \tag{8}$$

$$\frac{t}{q_t} = \frac{1}{k_2 q_e^2} + \frac{1}{q_e} \cdot t, \tag{9}$$

$$q_t = k_i t^{1/2} + C, \tag{10}$$

where $q_t$ and $q_e$ indicate the amount of the adsorbed MB dye at time t (minutes) and at equilibrium (mg/g), respectively; $k_2$ and $k_i$ are the pseudo-second-order (g mg$^{-1}$ min$^{-1}$) and the intra-particle diffusion rate constant (mg g$^{-1}$ min$^{-1/2}$) for the ongoing adsorption process, respectively, and C is the intercept on the y-axis (mg/g). Effect of the initial dye concentration ($C_0$) on parameters of different kinetic models for MB adsorption onto the cross-linked PMMA/IL/TiO$_2$ nanocomposite was reported in TABLE 1.

TABLE 1

Effect of the initial dye concentration ($C_0$) on parameters of different kinetic models for MB adsorption on the cross-linked PMMA/IL/TiO$_2$ nanocomposite

| | | pseudo-first-order | | | pseudo-second order | | | Intra-particle diffusion | | |
| --- | --- | --- | --- | --- | --- | --- | --- | --- | --- | --- |
| $C_0$ (mg/L) | $q_{e,exp}$ (mg/g) | $K_1$ (min$^{-1}$) | $q_{e,calc}$ (mg/g) | $R^2$ | $K_2$ (mg/g min$^{0.5}$) | $q_{e,calc}$ (mg/g) | $R^2$ | $K_1$ (mg/g min$^{0.5}$) | C (mg/L) | $R^2$ |
| 200 | 55.10 | 0.0029 | 44.01 | 0.9999 | 0.000150 | 55.02 | 0.9915 | 2.30 | 3.22 | 0.9865 |
| 400 | 82.80 | 0.0047 | 51.12 | 0.9995 | 0.000280 | 84.13 | 0.9910 | 3.25 | 31.21 | 0.9786 |
| 600 | 115.87 | 0.0080 | 65.20 | 0.9998 | 0.000378 | 118.21 | 0.9828 | 4.12 | 49.44 | 0.9796 |

Example 8: X-Ray Photoelectron Microscopy (XPS)

In this example, in order to compare the characteristics of the cross-linked PMMA/IL/TiO$_2$ nanocomposite before and after using for MB removal, X-ray photoelectron microscopy (XPS) analysis was performed. The XPS analysis was done using an XPS instrument with an Al Kα source, which was operated with a power of 350 Watt and at a pressure of $10^{-10}$ Torr. The reference for binding energies was adventitious carbon with a binding energy of 284.8 eV.

Figure 11:
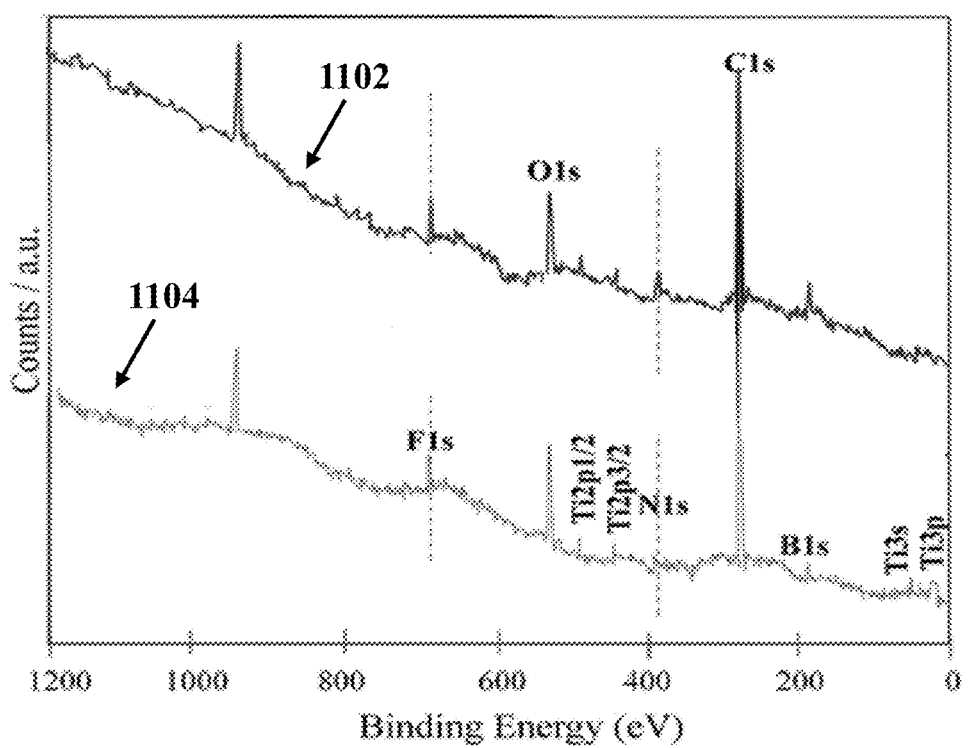
FIG. 11 illustrates X-ray photoelectron spectroscopy (XPS) spectra of cross-linked PMMA/IL/$TiO_2$ nanocomposites before (top) and after 10 runs of wastewater treatment (bottom), consistent with an exemplary embodiment of the present disclosure.

FIG. 11 shows XPS spectra of the cross-linked PMMA/IL/TiO$_2$ nanocomposite before (top-1102) and after using the cross-linked PMMA/IL/TiO$_2$ nanocomposite for 10 runs (bottom-1104), consistent with an exemplary embodiment of the present disclosure. Referring to FIG. 11, the XPS spectra of the cross-linked PMMA/IL/TiO$_2$ nanocomposite demonstrate that the samples contain six elements titanium (Ti), oxygen (O), carbon (C), nitrogen (N), boron (B), and fluorine (F).

Referring again to FIG. 11, the chemical binding energies were 460.1 eV, 536.7 eV, and 289.7 eV for Ti 2p3/2, O 1s, and C 1s, respectively. The N 1s, B 1s, and F 1s correspond to the ionic liquid [bmim][BF4] molecules in the IL/oil microemulsion with chemical binding energies of 398.8 eV, 382.5 eV, and 698.7 eV, respectively. The signal at 398.8 eV for N is may be ascribed to positively charged nitrogen atom for the cations of the ionic liquid. The B 1s and F 1s also correspond to tetrafluoroborate anion. The PMMA matrix (corresponding panel for C 1s) has four chemical components. The height of the peak at 289 eV is attributed to carbonyl groups in PMMA. At 287 eV there is a small peak related to C—O bond of the PMMA matrix.

Referring again to FIG. 11, in spectrum 1104, the cross-linked PMMA/IL/TiO$_2$ nanocomposite was utilized for 12 cycles without any recovery treatment, the elements of C, Ti and O may clearly identify, with the same binding energies of C 1s, Ti 2p, and O 1s. It should be noticed that the panel for O 1s, appeared at 532 eV, is related to hydroxyl groups, while the peak for a water molecule, which expected to be at 534.0 eV was not detected.

Both of spectra 1102 and 1104 do not show significant changes before and after using the cross-linked PMMA/IL/TiO$_2$ nanocomposite. The result confirms that there is no MB adsorption during the photodegradation process by the cross-linked PMMA/IL/TiO$_2$ nanocomposite. Small changes in sub-peak of O 1s that may be observed in the spectrum 1104 might be due to an increase in hydroxyl radicals on the surface of the cross-linked PMMA/IL/TiO$_2$ nanocomposite after photocatalysis, which may be advantageous for the photocatalytic activity for degradation of organic pollutant.

Example 9: Recycling and Stability of the Photocatalytic Filter

Recycling a catalyst is a key step in assessing the catalyst practical application and developing heterogeneous photocatalysis technology for wastewater treatment. In this example, recycling and stability of the photocatalytic filter were studied. The photocatalytic filter was used for several adsorption-photocatalytic runs of MB removal, and each run lasted about 180 minutes to confirm the synergistic effect of adsorption and photocatalysis.

Figure 12:
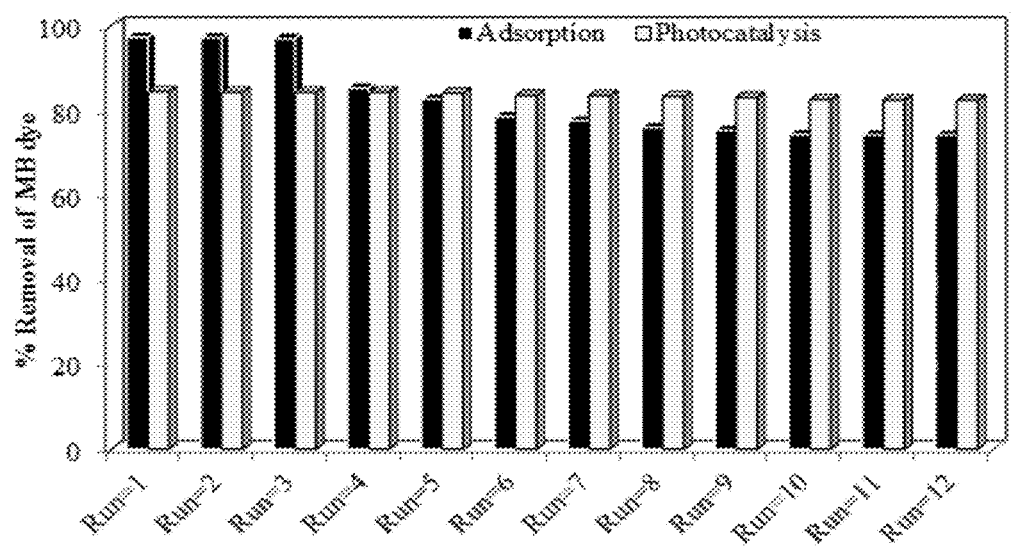
FIG. 12 illustrates reusability of an exemplary photocatalytic filter for removing MB in dark and light conditions, consistent with an exemplary embodiment of the present disclosure.

FIG. 12 shows reusability of a photocatalytic filter for removing MB in dark and light conditions, consistent with an exemplary embodiment of the present disclosure. Referring to FIG. 12, the results confirm that the photocatalytic filter including the plurality of the cross-linked PMMA/IL/TiO$_2$ nanocomposite is a reusable and stable filter, and may maintain high activity after several runs.

Referring again to FIG. 12, deactivation of the cross-linked PMMA/IL/TiO$_2$ nanocomposite during the adsorption process after 10 runs may perhaps relates to two reasons: surface poisoning and aggregation of nanoparticles on the surface of the nanocomposite that may be solved by photocatalysis process under visible-light irradiation due to photodegradation of pollutants such as MB dye, which were adsorbed on the surface of the cross-linked PMMA/IL/TiO$_2$ nanocomposite. Furthermore, usage of the IL/oil microemulsion is caused a higher concentration of hydroxyl radicals, which may control the recombination of photo-generated electron/hole pairs during the photocatalysis.

Figure 13:
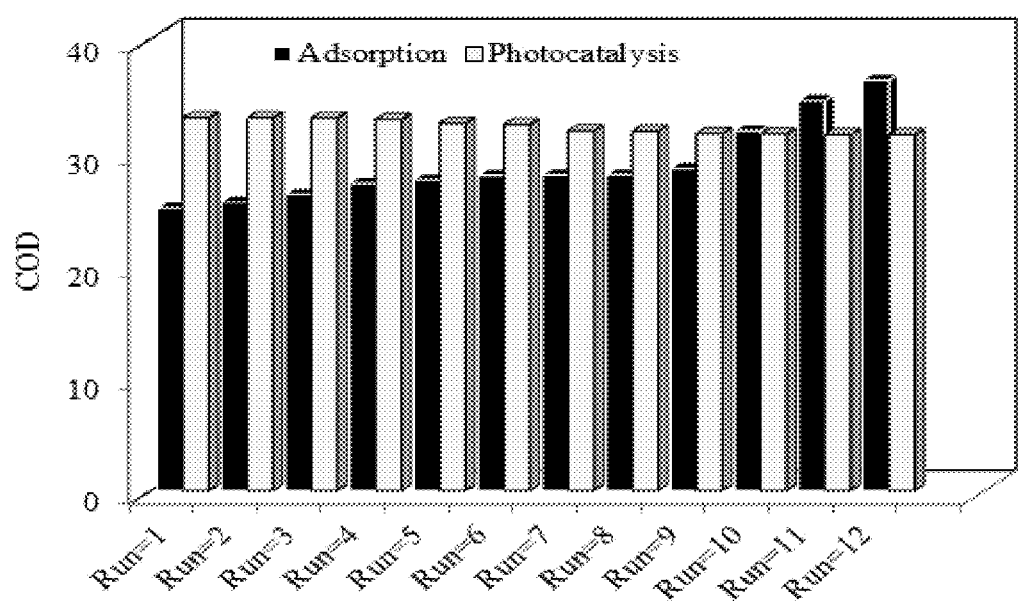
FIG. 13 illustrates chemical oxygen demand (COD) values for removing MB using an exemplary photocatalytic filter after different runs in dark and light conditions, consistent with an exemplary embodiment of the present disclosure.

Moreover, as the reduction of chemical oxygen demand (COD) reflects the extent of degradation by the photocatalytic filter, the change of COD concentration in the photodegradation of MB dye was investigated under visible-light irradiation for 2 hours. FIG. 13 shows COD values for removing MB dye using a photocatalytic filter after different runs in dark and light conditions, consistent with an exemplary embodiment of the present disclosure. The initial COD value of MB solution was about 389.80 mg/L.

Referring to FIG. 13, after 2 hours of visible-light irradiation, the COD value of the MB solution was decreased to 35.32 mg/L by the photocatalytic filter. The reduction of COD value further verifies that the MB dye was successfully photodegraded by the cross-linked PMMA/IL/TiO$_2$ nanocomposite pellets of the photocatalytic filter.

Example 10: Antibacterial Activity Test

In this example, antibacterial activity tests of the non-cross-linked PMMA/IL/TiO$_2$ nanocomposites and the cross-linked PMMA/IL/TiO$_2$ nanocomposites were performed using the Kirby-Bauer method and the membrane permeability assessment. The oxidative stress and cell permeability were also investigated.

In these tests, clinical-isolated Gram-positive and Gram-negative bacteria were used. Agar well diffusion method was also used at a pH level of about 7.3 for determining the degree of photocatalytic destruction of bacteria. At first, 20 ml of sterile molten Mueller-Hinton agar was poured into sterile Petri dishes and allowed to solidify at room temperature. Pure cultures of pathogenic bacteria with a standard of 0.5 McFarland (108 CFU/ml) was swabbed on the Muller-Hinton agar plates.

Then, the nanocomposite samples were placed onto 5 mm paper disk on the inoculated surface of Mueller-Hinton agar plates. Inoculated plates were incubated for about 24 hours at a temperature of 37° C. in a thermostatic incubator under visible-light irradiation. The inoculated plates were kept 20 cm away from the light source. After that for evaluating the antibacterial activity of the nanocomposites, the zone of inhibition was measured for each plate, and the results were compared to the control group which includes pure PMMA instead of the nanocomposite. The procedure was repeated three times.

In order to confirm Kirby-Bauer method for determining antibacterial activity of the nanocomposite samples, another method based on membrane permeability assessments performed. A membrane permeability assessment is based on lactate dehydrogenase (LDH) enzyme which acts as an indicator of membrane permeability.

In membrane permeability assessment, the bacterial suspension of individual isolate E. coli was exposed to the nanocomposite samples, and level of released extracellular LDH was examined. Level of LDH was measured by centrifuging bacterial cells for 10 minutes and the supernatant was examined based on the standard protocol. After preparing the supernatant, the absorbance of the supernatant was measured at a wavelength of 340 nm using a UV-Vis spectrophotometer.

Moreover, quantifying the number of reactive oxygen species (ROS) was estimated by the Dichloro-dihydro-fluorescein diacetate (DCFH-DA) fluorescent probe. Oxidation of DCFH-DA to highly fluorescent 2',7'-dichlorofluorescein (DCF) in the presence of cellular esterase and ROS is the proposed mechanism behind quantification of ROS. The generation of ROS was investigated by exposing bacterial cells to the non-cross-linked and cross-linked PPMA/IL/$TiO_2$ nanocomposites for 24 hours.

In this procedure, about 5 ml of the bacterial cell suspension with 100 μM of the DCFH-DA were incubated with the nanocomposite samples for about 30 minutes. After that, fluorescence intensity was checked using a fluorescence spectrophotometer with an excitation wavelength of 485 nm and the emission wavelength of 530 nm. TABLE. 2 represents the antibacterial parameters of the non-cross-linked and cross-linked PMMA/IL/$TiO_2$ nanocomposite.

The bacterial cell membrane is the primary attack site of the hydroxyl radicals and ROS, which leads to lipid peroxidation of the cell membrane; therefore, the degradation of the cell wall and cytoplasmic membrane by hydroxyl radicals and hydrogen peroxide leads to leakage of cellular contents, and cell lysis.

It is well known that antibacterial ability of a sample is because disrupting the cell membrane integrity by the generation of intracellular and extracellular reactive oxygen species. The fluorescence intensity which is related to the oxidative stress is the maximum for the cross-linked PMMA/IL/$TiO_2$ nanocomposite. Results of the antibacterial tests indicate that the cross-linked PMMA/IL/$TiO_2$ nanocomposite has more antibacterial activity than non-cross-linked PMMA/IL/$TiO_2$ nanocomposite.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications

TABLE 2

Antibacterial parameters of the non-cross-linked PMMA/IL/$TiO_2$ nanocomposite (#1) and the cross-linked PMMA/IL/$TiO_2$ nanocomposite (#2)

| Bacteria | Inhibition Zones (mm) | | MIC (mg/L) | | MBC (mg/L) | | LDH Increase (%) | | Fluorescence intensity (a. u.) | |
|---|---|---|---|---|---|---|---|---|---|---|
| | #1 | #2 | #1 | #2 | #1 | #2 | #1 | #2 | #1 | #2 |
| E. Coli (G$^-$) | 35 | 35 | 0.78 | 0.78 | 0.78 | 0.78 | 87.21 | 88.00 | 90.54 | 91.11 |
| Klebsiella (G$^-$) | 34 | 34 | 0.75 | 0.75 | 0.75 | 0.75 | 87.03 | 89.21 | 91.23 | 91.45 |
| Bacillus (G$^+$) | 30 | 31 | 0.66 | 0.66 | 0.52 | 0.52 | 85.43 | 84.56 | 90.00 | 91.08 |
| Staphylococcus aureus (G$^+$) | 31 | 30 | 0.66 | 0.66 | 0.52 | 0.52 | 87.39 | 88.02 | 89.87 | 90.12 |

Referring to TABLE. 2, the zone of inhibition data shows that the non-cross-linked and cross-linked PMMA/IL/$TiO_2$ nanocomposites have much more antibacterial activity against Gram-negative (G$^-$) than the Gram-positive bacteria (G$^+$). Also, hydrophobic PMMA matrix is selected for forming the nanocomposites, because the hydrophobic nature of the PMMA leads to low bacterial adhesion.

The maximum antibacterial efficiency was similar for the non-cross-linked and the cross-linked PMMA/IL/$TiO_2$ nanocomposite has broad-spectrum antibacterial activity. As expected, the antibacterial activity was found to increase with the increased dosage of $TiO_2$ and decreased again at higher loading of $TiO_2$ more than 0.01%. As mentioned above decreasing antibacterial activity at higher loading of $TiO_2$ may be due to aggregation of $TiO_2$ nanoparticles in the PMMA polymer matrix, which causing a decrease in the number of surface active site.

Referring again to TABLE. 2, the LDH release was observed to be much higher for the cross-linked PMMA/IL/$TiO_2$ nanocomposite than the non-cross-linked PMMA/IL/$TiO_2$ nanocomposite. The main killing mechanism for the antimicrobial effect of the non-cross-lined and cross-linked PMMA/IL/$TiO_2$ nanocomposites is attributed to the hydroxyl radicals and reactive oxygen species (ROS) which were produced during the photocatalysis.

that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in the light of the attached claims and their equivalents. Also, various modifications and changes may be made within the scope of the attached claims

What is claimed is:

1. A photocatalytic filter, comprising:
 a plurality of cross-linked polymethyl methacrylate (PMMA)/ionic liquid (IL)/$TiO_2$ nanocomposite pellets, each cross-linked PMMA/IL/$TiO_2$ nanocomposite pellet comprising:
  a PMMA polymeric matrix; and
  a plurality of IL/$TiO_2$ core-shell microspheres dispersed within the PMMA polymeric matrix, each IL/$TiO_2$ core-shell microsphere comprising a core of IL and a shell of $TiO_2$ nanoparticles; and
 a photocatalytic vessel,
 wherein the plurality of cross-linked PMMA/IL/$TiO_2$ nanocomposite pellets is placed within the photocatalytic vessel.

2. The photocatalytic filter according to claim 1, wherein the cross-linked PMMA/IL/$TiO_2$ nanocomposite pellets has a porosity between 50% and 70%.

3. The photocatalytic filter according to claim 1, wherein the photocatalytic filter is a visible-light-responsive filter.

4. The photocatalytic filter according to claim 1, wherein the photocatalytic vessel is made up of non-cross-linked PMMA/IL/$TiO_2$ nanocomposite.

5. The photocatalytic filter according to claim 1, wherein the $TiO_2$ is present in the cross-linked PMMA/IL/$TiO_2$ nanocomposite pellets with a concentration of less than 0.05% of the weight of the cross-linked PMMA/IL/$TiO_2$ nanocomposite pellets.

6. The photocatalytic filter according to claim 5, wherein the IL comprises 1-butyl-3-methylimidazolium tetrafluoroborate ([BMIM] [$BF_4$]).

7. The photocatalytic filter according to claim 6, wherein the IL is present in the cross-linked PMMA/IL/$TiO_2$ nanocomposite pellets with a concentration of at least 2% of the weight of the cross-linked PMMA/IL/$TiO_2$ nanocomposite pellets.

8. The photocatalytic filter according to claim 1, wherein the PMMA is present in the cross-linked PMMA/IL/$TiO_2$ nanocomposite pellets with a concentration of between 70% and 90% of the weight of the cross-linked PMMA/IL/$TiO_2$ nanocomposite pellets.

* * * * *